(12) United States Patent
Tomita et al.

(10) Patent No.: US 7,106,526 B2
(45) Date of Patent: Sep. 12, 2006

(54) THIN IMAGING APPARATUS, A THIN CAMERA, AND AN IMAGING METHOD

(75) Inventors: Yoshihiro Tomita, Osaka (JP); Katsumi Imada, Nara (JP); Tsuguhiro Korenaga, Katano (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 14 days.

(21) Appl. No.: 11/109,373

(22) Filed: Apr. 19, 2005

(65) Prior Publication Data

US 2005/0243439 A1 Nov. 3, 2005

(30) Foreign Application Priority Data

Apr. 21, 2004 (JP) ............................. P2004-125481

(51) Int. Cl.
*G02B 17/00* (2006.01)
*G03B 17/00* (2006.01)
*G03B 41/00* (2006.01)

(52) U.S. Cl. .................. 359/726; 396/267; 396/335; 396/351; 396/332

(58) Field of Classification Search ................ 359/619, 359/726–730; 396/267, 335, 322, 351, 332; 348/231.3, 231.99, 239, 240.1, 207.99
See application file for complete search history.

(56) References Cited

U.S. PATENT DOCUMENTS

| 4,442,457 A | 4/1984 | Pines .......................... 348/295 |
| 5,499,112 A * | 3/1996 | Kawai et al. ............... 358/475 |
| 6,698,891 B1 * | 3/2004 | Kato ............................ 353/20 |

FOREIGN PATENT DOCUMENTS

| JP | 58-150379 | 9/1983 |
| JP | 2003-255225 | 9/2003 |

* cited by examiner

*Primary Examiner*—Timothy Thompson
*Assistant Examiner*—M. Hasan
(74) *Attorney, Agent, or Firm*—RatnerPrestia

(57) ABSTRACT

A thin imaging apparatus with an extremely low profile captures high quality images with outstanding resolution. The imaging apparatus has a light guide, incidence mirror, imaging device, and aperture unit. The incidence mirror reflects and guides light from a subject into the light guide, and the imaging device receives the light from the subject reflected by the incidence mirror and passing through the light guide.

40 Claims, 20 Drawing Sheets

Fig. 1A OBLIQUE VIEW
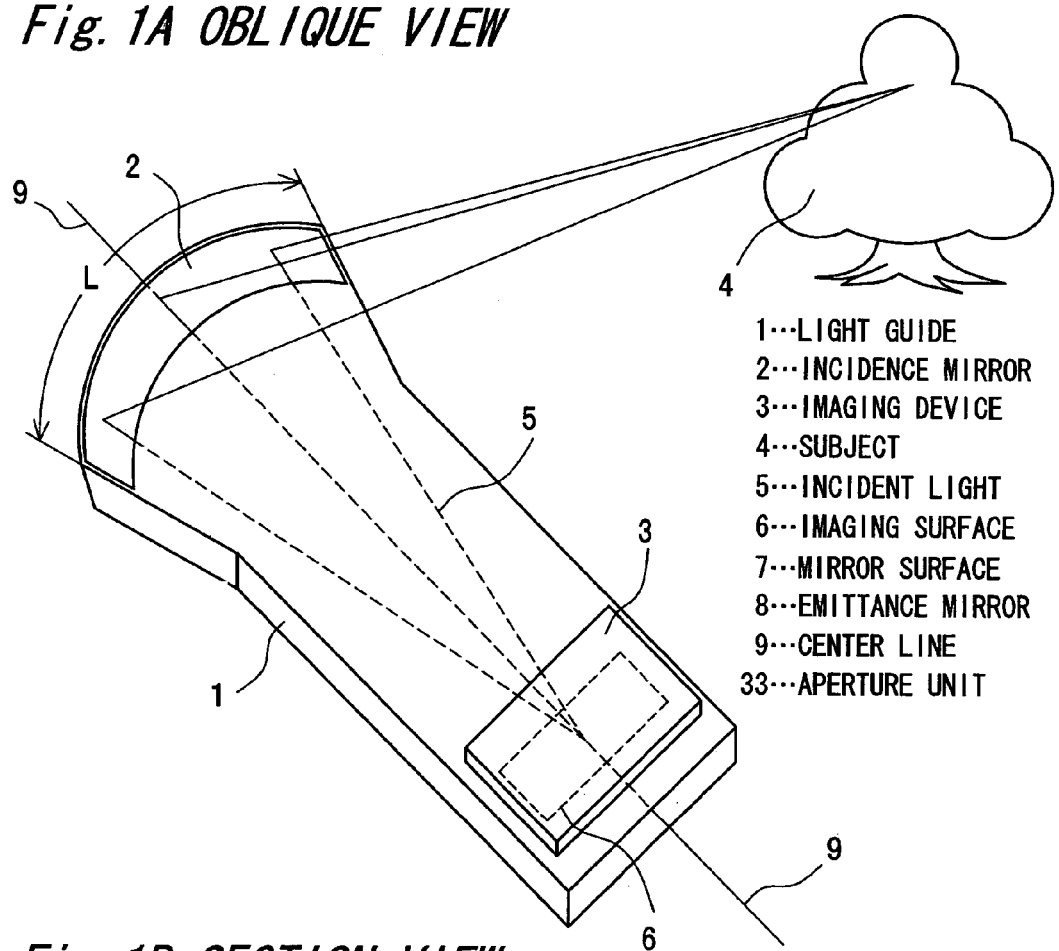
1···LIGHT GUIDE
2···INCIDENCE MIRROR
3···IMAGING DEVICE
4···SUBJECT
5···INCIDENT LIGHT
6···IMAGING SURFACE
7···MIRROR SURFACE
8···EMITTANCE MIRROR
9···CENTER LINE
33···APERTURE UNIT
Fig. 1B SECTION VIEW
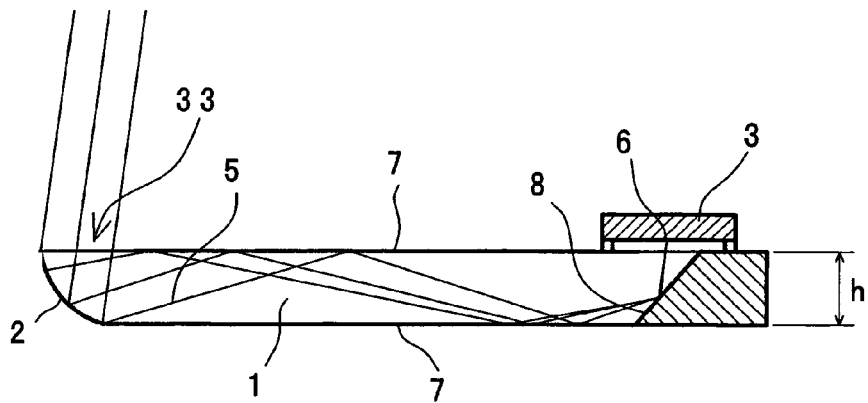

Fig. 3A SUBJECT IMAGE
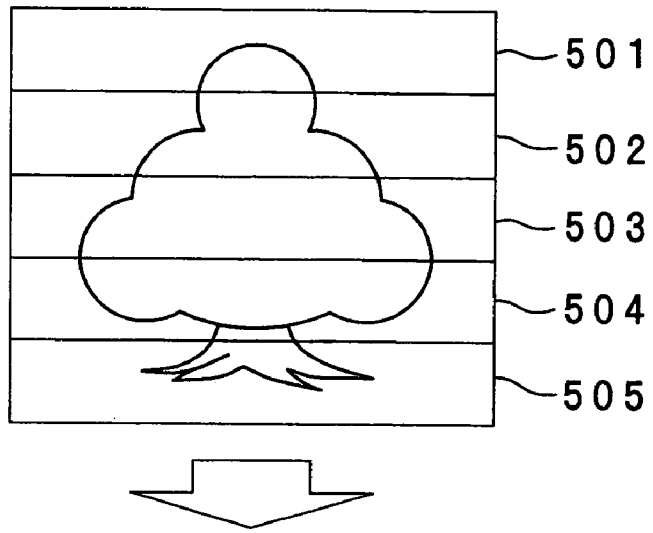
Fig. 3B SUBJECT IMAGE ON THE IMAGING SURFACE
SEPARATION OF IMAGE INFORMATION OF EACH VIEW ANGLE
Fig. 3C RECONSTRUCTED SUBJECT IMAGE
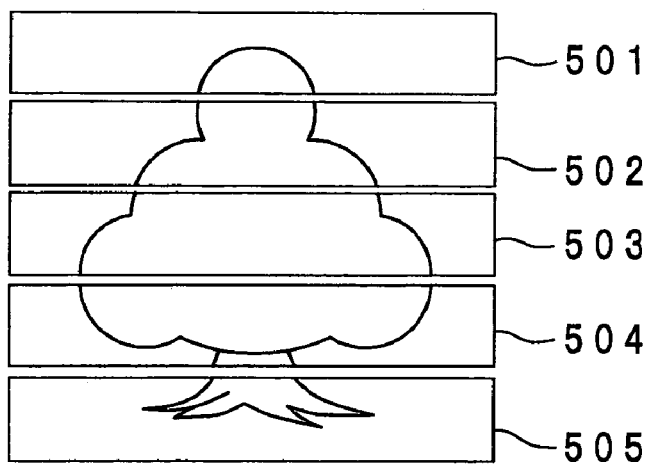

PRIOR ART

THIN IMAGING APPARATUS, A THIN CAMERA, AND AN IMAGING METHOD

BACKGROUND OF THE INVENTION

1. Field of the Invention

The present invention relates generally to an imaging apparatus such as a digital camera module, and relates more particularly to a thin imaging apparatus with an improved structure suitable for applications requiring an extremely thin profile such as in a portable information terminal.

2. Description of Related Art

Reductions in the size and improvement in the performance of CCD, CMOS sensor, and other types of imaging devices combined with advanced optical technologies such as aspheric lenses have enabled downsizing the imaging apparatus in which these imaging devices are used. As a result, imaging apparatus are increasingly being used in highly portable devices that can be taken anywhere, including compact digital cameras and cell phones with a built-in camera. Anticipating a variety of situations, even greater compactness and thinness are desired in the camera modules used in such portable devices.

The imaging apparatus used in a conventional camera module typically has a circular condenser lens with a CCD or CMOS sensor disposed at the focal plane of the lens for imaging. See, for example, Japanese Unexamined Patent Appl. Pub. 2003-255225, particularly pages 2 to 4, FIG. 1, and Table 1. FIG. 14 shows a conventional imaging apparatus as taught in Japanese Unexamined Patent Appl. Pub. 2003-255225.

Referring to FIG. 14, the condenser lens system 101 is composed of two lens groups 101a, 101b. Incident light collected by the condenser lens system 101 passes a glass filter 102 and forms an image on the imaging device 103. Note that FIG. 14 is a section view, and the condenser lens system 101 has a circular shape concentric to the optical axis denoted by the dot-dash line in FIG. 14. Zoom and focus functions are achieved by adjusting the positions of the two collector lens groups 101a, 101b. The aperture diaphragm 104 controls the effective aperture ratio of the lens system.

In a conventional imaging apparatus the imaging device 103 must be positioned at the focal plane on which the subject image is formed by the condenser lens system 101 in order to achieve a clearly focused image, and the focal length of the condenser lens system 101 determines the distance between the condenser lens system 101 and the imaging surface of the imaging device 103. Reducing the size and thickness of conventional imaging apparatuses is thus focused almost solely on shortening the focal length of the condenser lens system 101, shortening the distance to the imaging device 103, and thus shortening the total length of the optical system.

Using the examples shown in Table 1 in Japanese Unexamined Patent Appl. Pub. 2003-255225, the focal length can be varied in the range 2.46 to 4.74 mm and a zoom function thus achieved, but the total length of the lens system ranges from 10.79 to 12.91 mm, and an optical system significantly longer than the effective focal length is thus required. That the focal length must be shortened more than expected in order to shorten the total length of the optical system and achieve a lower profile will thus be obvious.

As taught in Japanese Unexamined Patent Appl. Pub. 2002-196243, another means of achieving a lower profile is to fold the optical path using a combination of multiple prisms.

As noted above, the arrangement taught in Japanese Unexamined Patent Appl. Pub. 2003-255225 reduces the size and thickness by shortening the focal length of the lens. The size of the images formed by this lens thus becomes smaller in proportion to the focal length, resulting in a drop in resolution relative to the size of the formed image if the pixel pitch of the imaging device remains the same. The pixel pitch of the imaging device must therefore be increased proportionally to the decrease in the focal length of the lens if image information of the same resolution is to be achieved.

The CCD and CMOS sensors that are currently used for the imaging device are already manufactured using the state-of-the-art semiconductor manufacturing processes, and increasing the pixel pitch requires an even higher resolution manufacturing process. Increasing the resolution of the manufacturing process increases the process cost while also significantly reducing yield. Increased device cost is thus unavoidable.

Furthermore, reducing the pixel pitch of the imaging device results in a drop in the light-receiving area of each pixel proportional to the square of the reduction rate of the pitch. Additional space is also needed outside the light-receiving area of each pixel to provide a matrix of lines for driving each pixel of the imaging device and charge transfer lines in a CCD, for example, and reducing the pixel pitch thus also reduces the effective aperture ratio enabling light detection. Light reception thus drops significantly, sufficient photoelectric conversion power is difficult to achieve, and image quality thus drops significantly.

Furthermore, the wavelength of visible light ranges from 200 nm to 800 nm, and the optical lens system becomes unable to resolve images at the wavelength level due to the diffraction limit. Even if an imaging device with a higher pixel pitch is achieved at the expense of yield, cost, and photoelectric conversion power, there is a limit to how much the size and thickness of the imaging apparatus can be reduced by reducing the focal length of the lens while maintaining high resolution due to the diffraction limit of light.

An optical system having a total length greater than the required focal length is therefore needed in a conventional imaging apparatus, and reducing the size and thickness of the imaging apparatus is thus even more difficult.

More succinctly, there is a limit to the reduction in size and thickness that can be achieved by shortening the focal length of the lens system in a conventional arrangement, and reducing the thickness (profile) is exceedingly difficult because of the difficulty in shortening the distance between the imaging device and lens, which is dependent upon the focal length of the lens.

SUMMARY OF THE INVENTION

To solve the foregoing problem, an object of the present invention is to provide a thin imaging apparatus having an extremely low profile whereby high quality image information can still be achieved with outstanding resolution.

A first aspect of the present invention is a thin imaging apparatus having an aperture; an incidence mirror for simultaneously reflecting incident light entering from a subject through the aperture; a light guide for guiding incident light reflected by the incidence mirror; a mirror surface disposed to at least part of a surface of the light guide; and an imaging device for simultaneously receiving in a superimposed condition at least a first light component representing one part of the subject guided through the light guide without being reflected by the mirror surface, and a second light component representing the other part of the subject reflected at least once and guided through the light guide by the mirror surface.

A second aspect of the invention is a camera having a thin imaging apparatus according to the first aspect of the invention; an operating unit enabling an operator to input an imaging command; an image data processing unit for generating image data by applying a specific process to image information from the thin imaging apparatus; a storage unit for storing the image data; and a controller for controlling the thin imaging apparatus, image data processing unit, and storage unit.

A third aspect of the invention is a camera having a thin imaging apparatus according to the first aspect of the invention housed in a card case.

A fourth aspect of the invention is an imaging method having a step of guiding a first light component that is part of incident light from a subject through a light guide directly to an imaging device without the first light component being reflected by a mirror surface formed on a surface of the light guide; a step of guiding a second light component that is another part of incident light from the subject through the light guide to the imaging device by reflecting the second light component at least once off a mirror surface formed on a surface of the light guide; and a step of simultaneously outputting at least an image of the first light component and an image of the second light component superimposed to each other from the imaging device.

The thickness of the optical system is at most approximately the thickness of the light guide in a thin imaging apparatus according to the present invention, thus affording an extremely low profile, while the optical distance from the incidence mirror through the light guide to the imaging device can be increased by simply increasing the length of the light guide. Our invention thus affords a low profile collector optics system with a long focal length. It is therefore not necessary to reduce the size of the subject image even though the imaging apparatus is extremely thin. An expensive imaging device in which the pixel pitch is reduced proportionally to the focal length such as required in a conventional low profile imaging apparatus is therefore not needed, and high resolution images can be captured.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1A is an oblique view of a thin imaging apparatus according to a first embodiment of the present invention;

FIG. 1B is a section view through the center line shown in the oblique view of FIG. 1A;

FIGS. 3A, 3B, and, 3C are schematic diagrams describing reconstructing a subject image in a thin imaging apparatus according to the first embodiment of the invention;

DETAILED DESCRIPTION OF THE PREFERRED EMBODIMENTS

Figure 2A:
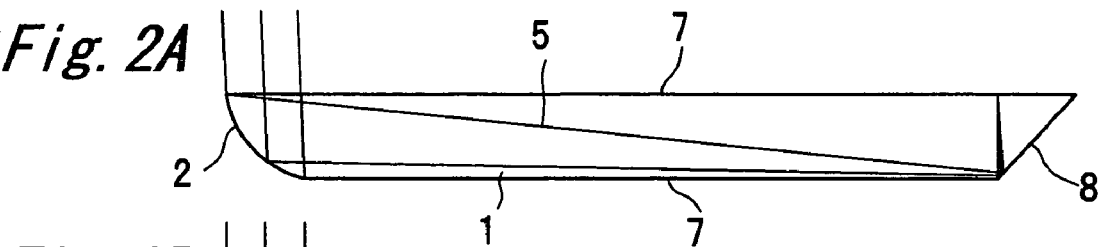
FIGS. 2A to 2H are section views describing the propagation of incident light through the light guide of a thin imaging apparatus according to the first embodiment of the invention.

Preferred embodiments of the present invention are described below with reference to the accompanying figures.

(Embodiment 1)

The arrangement of a thin imaging device according to a first embodiment of the present invention is described below with reference to FIGS. 1A and 1B. FIG. 1A is an oblique view of this thin imaging apparatus, and FIG. 1B is a section view through center line 9 in FIG. 1A.

As shown in FIGS. 1A and 1B this imaging apparatus has a light guide 1, incidence mirror 2, imaging device 3, emittance mirror 8, and aperture unit 33. The incidence mirror 2 is disposed at one end of the light guide 1, and the emittance mirror 8 and imaging device 3 are disposed at the other end of the light guide 1.

Light from the subject 4 passes through the aperture unit 33 and is incident to the imaging apparatus, reflected by the incidence mirror 2, and thus guided into the light guide 1. The incident light 5 thus guided forms an image on the imaging surface 6 of the imaging device 3, and the subject is thus imaged. The light guide 1 is a path through which the incident light 5 travels inside and in this and the following embodiments of this invention has a flat panel shape. Mirror surfaces 7 are rendered inside the light guide 1 so that the incident light 5 is reflected by both main surfaces of the light guide 1. More specifically, the present invention has parallel or substantially parallel mirror surfaces 7 disposed to a light path (indicated by line 9 in FIG. 1A) connecting the incidence mirror 2 and emittance mirror 8 (or imaging device 3) in a straight line inside the light guide 1.

The imaging device 3 is positioned on the top main surface of the light guide 1 opposing to the emittance mirror 8 and images the incident light 5 reflected by the emittance mirror 8 to the top main surface of the light guide 1. The image contained in part of the incident light 5 traveling directly through the light guide 1 thus reaches the imaging device 3 and is imaged while the image contained in the other part of the incident light 5 not traveling directly through the light guide 1 is reflected by the mirror surfaces 7 to reach the imaging device 3 and be imaged. The image signal acquired by the imaging device 3 is processed by an image processing circuit not shown in FIGS. 1A and 1B, and electrical image data is thus acquired.

The light guide 1 is made from an organic optical material such as polycarbonate polymer, acrylic polymer, cyclo-olefin polymer, or epoxy resin, or an inorganic optical material such as common optical glass, for example. The refractive index of these optical materials is typically approximately 1.5. Optical materials with a higher refractive index that could be used for the light guide 1 include high refractive index glass and high refractive index plastic such as polymers containing sulfur.

The shape of the light guide 1 shall also not be limited to a flat configuration, and insofar as the incident light 5 reflected by the mirror surfaces 7 can reach the imaging device 3, the main surfaces of the light guide 1 could have a slight curve. Imparting a curve to the light guide 1 enables providing an aberration correction function, for example.

In order to collect the incident light 5 in the direction of the imaging surface 6, the shape of the incidence mirror 2 in the plane parallel to the main surface of the light guide 1 is a narrow flat arc. The incident light 5 is thus collected in a plane parallel to the main surface of the light guide 1. As shown in FIG. 1B, the incidence mirror 2 forms a concave mirror surface in section view so that the incident light 5 can also be collected on the imaging surface 6 through the light guide 1 in section. The function of collecting the incident light 5 in the section of the light guide 1 shall not be limited to the incidence mirror 2, and can also be shared by the emittance mirror 8.

Thus arranged, a light-gathering optical system (collective optical system) of a specific focal length is afforded by the incidence mirror 2, and the length of the light path of the light-gathering optics from the incidence mirror 2 through the light guide 1 to the imaging device 3 can be increased inside the light guide 1. As a result, the loss of resolution due to shrinkage of the subject resulting from shortening the focal length of the collection lens in order to achieve a lower profile that occurs with an imaging device according to the prior art can be avoided by the present invention. More specifically, this embodiment of the present invention effectively increases the length of the light path used for light gathering inside the light guide 1. The light-gathering optical system of the present invention thus affords both a low profile (thin design) and a focal length equal to the focal length required to achieve a high resolution image in a conventional imaging apparatus. Subjects imaged on the imaging surface of this imaging apparatus will thus not be reduced to such a degree that images having satisfactory resolution cannot be achieved without using a higher resolution imaging device.

As a result, high resolution images can be captured using an imaging device with a conventional pixel pitch.

Furthermore, the thickness of the light guide 1 constituting the collection path is thin, the incidence mirror 2 constituting the light-gathering optical system can be rendered to the same thickness as the light guide 1, and the overall device thickness can therefore also be reduced. The arrangement of this embodiment of the invention thus enables acquiring high resolution images while using an extremely low profile, thin optical system.

More specifically in this embodiment of the invention the thickness h of the incidence mirror 2 and light guide 1 is 1 mm, the length L of the incidence mirror 2 is 10 mm, and the light path length from the incidence mirror 2 to the imaging position of the imaging device 3 is 10 mm. When the imaging device 3 is a long narrow configuration 350 µm thick with an imaging surface 6 measuring 8 mm by 1.2 mm, a thin design with a total thickness of 1.5 mm or less including the optics and the imaging device 3 can be achieved, and high resolution equal to the resolution achieved with a conventional imaging apparatus using a lens with a 10 mm focal length can be achieved. Furthermore, if an optical system with a longer focal length is required, the length of the light guide 1 can be increased without increasing the thickness.

To achieve this thickness with a conventional imaging apparatus, the focal length of the lens must be approximately 1 mm or less, the resulting subject image will be 1/10 the size of the subject image formed by a lens having 10 mm focal length, and achieving high resolution will be difficult. If the subject image measures 1 mm×1 mm, for example, and a so-called megapixel image having one-million pixels is to be achieved, each pixel can measure only 1 µm×1 µm. In addition to achieving a CCD or CMOS sensor imaging device with such fine resolution being extremely difficult, resolution on the order of the light wavelength is also required, and achieving a high resolution image is thus further complicated by the diffraction limit of the light.

Figure 2B:
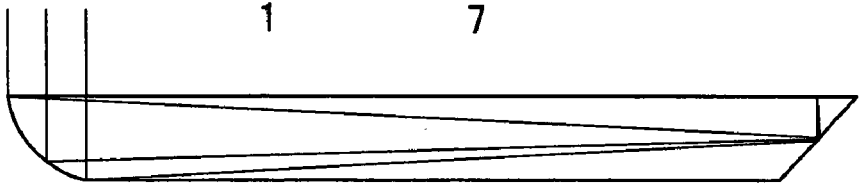

The function of the mirror surfaces 7 disposed to both sides of the light guide 1 is described next below with reference to FIGS. 2A, 2B, 2C, 2D, 2E, 2F, 2G, and, 2H. FIGS. 2A, 2B, 2C, 2D, 2E, 2F, 2G, and, 2H are section diagrams schematically showing the propagation of incident light through the light guide 1. FIGS. 2A, 2B, and, 2C show the direct transmission of incident light 5 from the incidence mirror 2 to the emittance mirror 8 and reflected thereby to the imaging device 3 without being reflected by the mirror surfaces 7. The imaging position changes according to the angle of incidence from the subject, and images in this visual field can thus be captured.

Figure 2C:
Figure 2D:
Figure 2E:
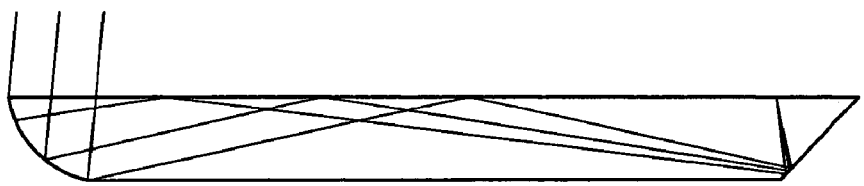

FIGS. 2D and 2E show the path of incident light 5 imaged when reflected once by the top mirror surface 7. By thus imaging the reflection from a mirror surface 7, images in this field neighboring the field of incident light 5 transmitted directly through the light guide 1 can also be captured.

Note that the images acquired by light passed by the paths indicated in FIGS. 2A, 2B, and, 2C and the light passed as shown in FIGS. 2C, 2D, and, 2E are reverse images inverted at the position of the images imaged by the light passed as shown in FIG. 2C.

Figure 2F:
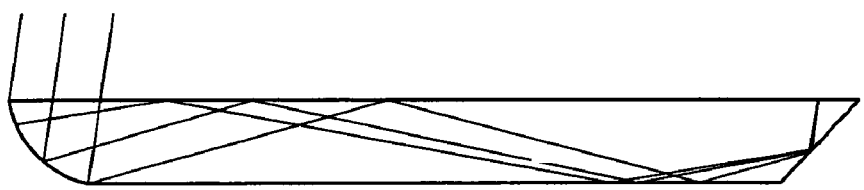
Figure 2G:

FIGS. 2F and 2G show the incident light 5 reflected multiple times by the mirror surfaces 7, thus achieving an even wider view angle, similarly to the case for capturing images of the light passed through the light guide 1 with a single reflection on the mirror surfaces 7.

Figure 2H:
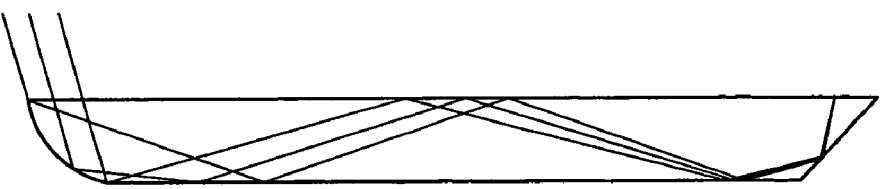

As shown in FIG. 2H, images can also be captured from the opposite visual field as that depicted in FIGS. 2A, 2B, 2C, 2D, 2E, 2F, and, 2G, that is, from the visual field on the left side as seen in the figures from the visual field denoted by FIGS. 2A, 2B, and, 2C. Note that the visual field and the view angle indicate all or part of the subject field.

FIGS. 3A, 3B, and, 3C simulate a subject image reflected by the mirror surfaces 7. The original subject shown in FIG. 3A is divided into images of multiple different visual fields depending on the number of times the light is reflected by the mirror surfaces 7 and difference in the mirror surface 7 that reflects the light, and images from these multiple fields are formed overlapping on the imaging surface 6 as shown in FIG. 3B. In this embodiment of the invention the image processing circuit separates the image data from each view angle to acquire an image of the original subject as shown in FIG. 3C. As shown in FIGS. 3A and 3C, the subject image is segmented in one direction (vertically in this embodiment) into five rectangular segments constituting an image of one image frame. Of these, the visual field image 503 (middle segment) represents the part of the incident light 5 that reaches the imaging device 3 without being reflected by the mirror surfaces 7. The second and fourth visual field images 502 and 504 are composed of the parts of the incident light 5 that reach the imaging device 3 after being reflected once by a mirror surface 7, and the first and fifth visual field images 501 and 505 are composed of the parts of the incident light 5 that reach the imaging device 3 after being reflected twice by the mirror surfaces 7.

By thus causing the optical information from the subject 4 to overlap on the imaging device 3 for imaging, the area of the imaging surface 6 of the imaging device 3 required for imaging is less than the imaging area required in a conventional imaging apparatus to image the same visual field. The size of the imaging device 3 can thus be further reduced, and the manufacturing cost of the imaging apparatus can thus be lowered.

One method of separating the image data from each angle of view is to separate the images based on the incidence angle of the incident light 5 entering the imaging device 3. As will be known from the light paths of the incident light 5 entering from different viewing angles as shown in FIGS. 2A, 2B, 2C, 2D, 2E, 2F, 2G, and, 2H, the angle of incidence to the imaging device 3 varies according to the view angle of the light from the subject entering the light guide 1. The original subject image can therefore be acquired by providing a means of differentiating the angle of incidence to the imaging device 3 just before the imaging device 3 and extracting the images from each angle of incidence by running an image data processing.

Figure 4A:
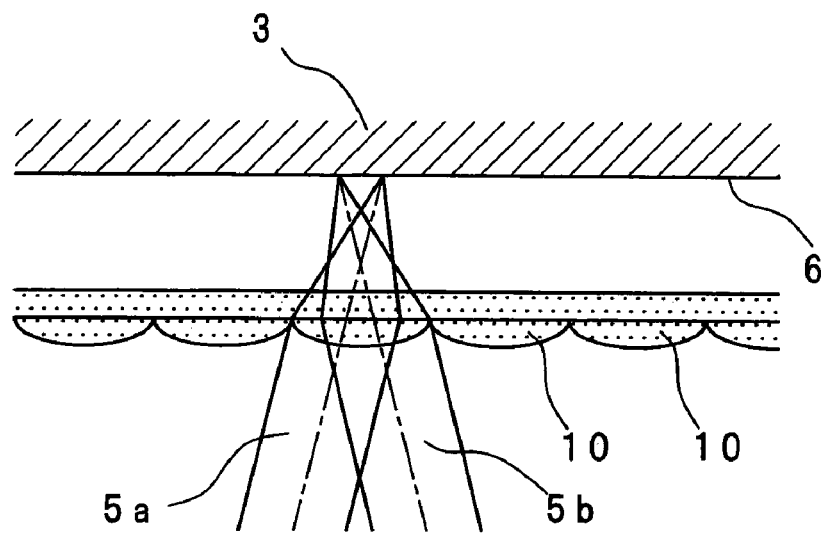
FIGS. 4A, 4B, and, 4C are section views describing a method of differentiating the viewing angle of incident light in a thin imaging apparatus according to the first embodiment of the invention.
Figure 4B:
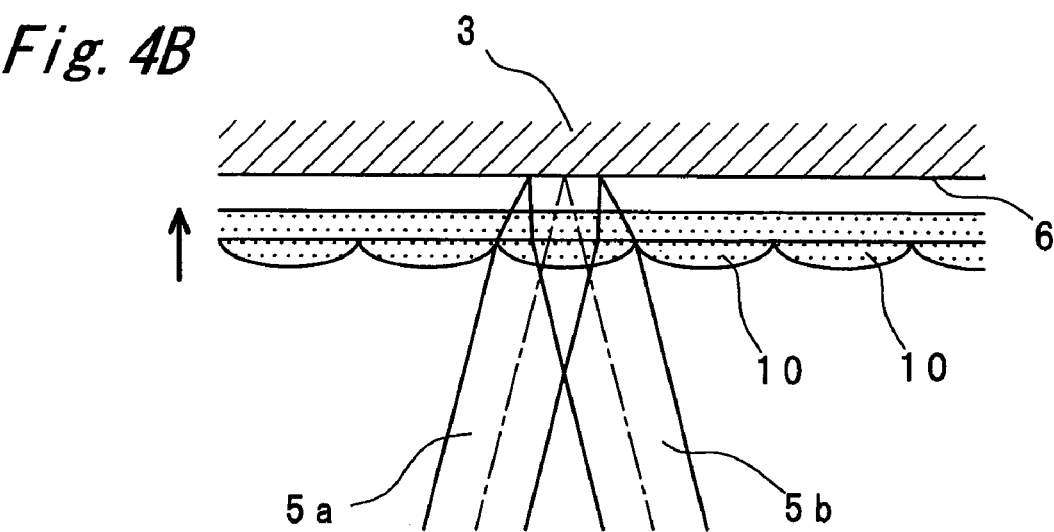

FIGS. 4A, 4B, and, 4C show an optical method of separating the light based on the incidence angle of light incident to the imaging device 3. FIG. 4A shows the arrangement of the optics near the imaging surface 6 of the imaging device 3, specifically by means of an array of cylindrical lenses 10 having a cylindrical curved surface disposed at a constant pitch in front of the imaging device 3 so that the focal point is on the imaging surface 6. As will be known from the figure, light 5a from one visual field and light 5b from a different visual field are incident at different angles, and the positions where the light is focused on the imaging surface 6 by the cylindrical lenses 10 differ according to the incidence angle. The incidence angle and viewing angle can thus be differentiated from this imaging position. Because the focal point of each cylindrical lens 10 is on the imaging surface 6, light incident to a particular position on one cylindrical lens 10 will be focused on the same point if the incidence angle is the same, and the information from various viewing angles can thus be accurately separated.

In the arrangement shown in FIG. 4B, the cylindrical lenses 10 are disposed closer to the imaging surface 6 than in the arrangement shown in FIG. 4A, and incident light 5a and 5b both form images on the imaging surface 6 substantially independently of the viewing angle. The arrangement shown in FIG. 4A is therefore better for identifying the incidence angles of the light than for rendering high resolution images, and the arrangement shown in FIG. 4B is better for rendering high resolution images than for incidence angle separation. Therefore, by locating the cylindrical lenses 10 at a position between the positions shown in FIG. 4A and FIG. 4B, or by changing the position of the cylindrical lenses 10 between the positions shown in FIG. 4A and FIG. 4B, images from different viewing angles can be extracted by an image data processing using the image data acquired from these imagings at multiple different positions of the cylindrical lenses 10, and the original image can thus be restored.

Figure 4C:
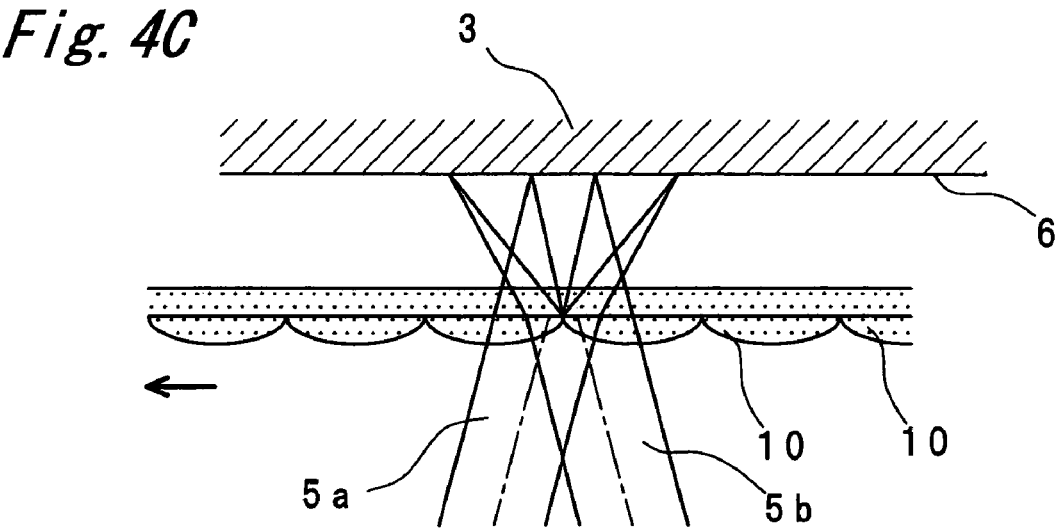

As shown in FIG. 4C, moving the cylindrical lenses 10 in the same direction as which the lenses are arrayed (that is, parallel to the imaging surface 6) causes the images formed on the imaging surface 6 to vary. According to the imaging position determined by the viewing angle and the position of the light rays incident to the cylindrical lenses 10, separation of the images by viewing angle and restoring the original image are possible by an image data processing using the image data from these multiple images.

The original image can also be restored by acquiring image data from multiple views using a combination of movement in the direction changing the distance between the cylindrical lenses 10 and the imaging device 3 (shown in FIG. 4B) and movement in the direction in which the cylindrical lenses 10 are arrayed (shown in FIG. 4C).

Cylindrical lenses are used as the means of optically splitting incident light according to the incidence angle of the light incident to the imaging device 3, but an optical system using Fresnel lenses, for example, with the ability to collect light beams at different incidence angles could alternatively be used.

(Embodiment 2)

Figure 5A:
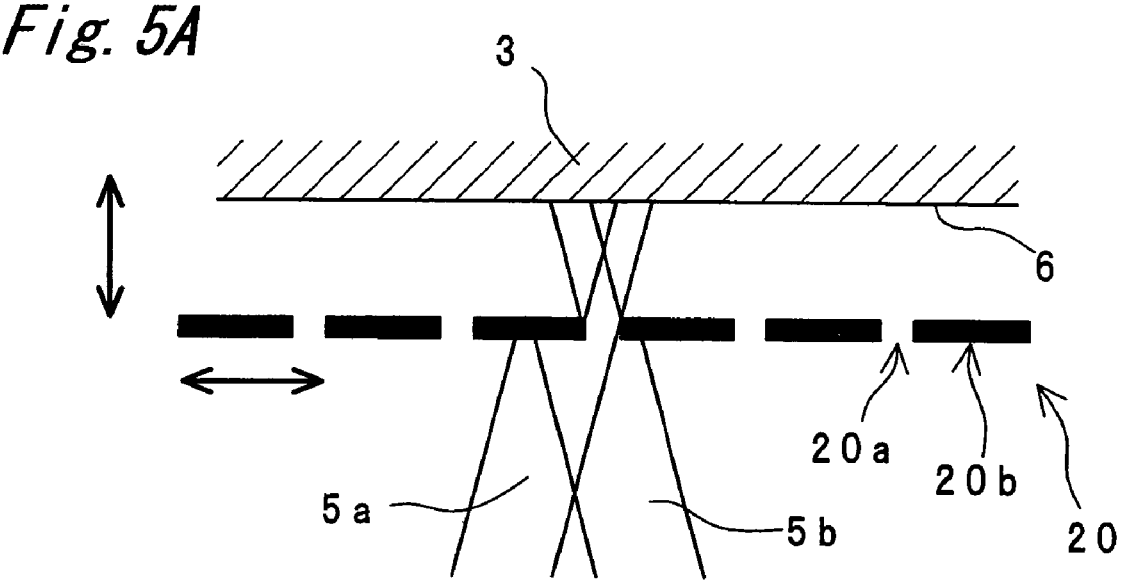
FIGS. 5A and 5B are section views describing a method of differentiating the viewing angle of incident light in a thin imaging apparatus according to a second embodiment of the invention.
Figure 5B:
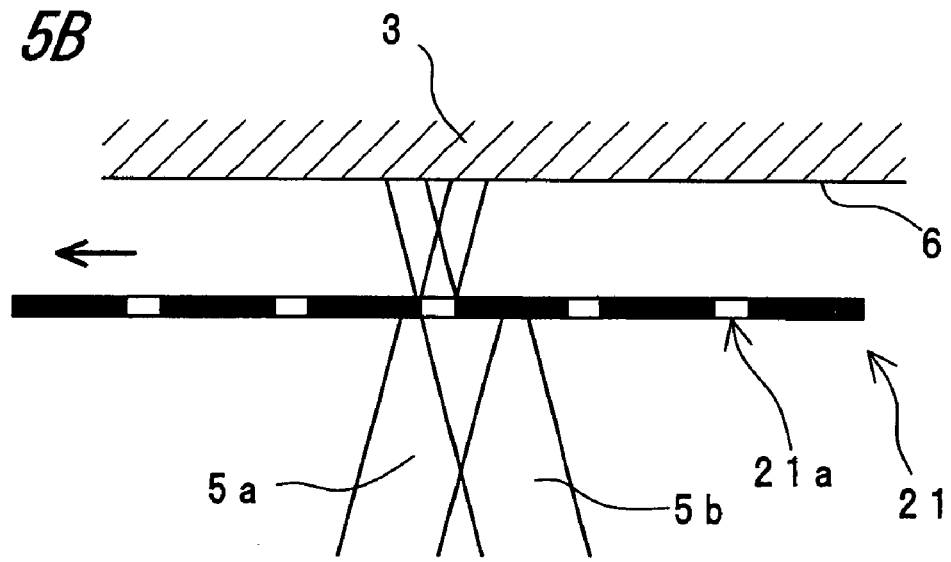

FIGS. 5A and 5B show an optical arrangement in front of the imaging device 3 in a thin imaging apparatus according to a second embodiment of the present invention for selecting and separating incident light 5 according to the incidence angle. The arrangement whereby incident light 5 entering the light guide 1 reaches the front of the imaging device 3 is the same as described in the foregoing first embodiment of the invention.

Referring to FIG. 5A, an optical slit array 20 having slit portions 20a and shield portions 20b is disposed separated a specific distance from the front of the imaging surface 6 of the imaging device 3. Incident light 5a and 5b entering at different incidence angles therefore cast shadows at different positions on the imaging surface 6, and images from different incidence angles can thus be separated.

Because light obviously does not pass at the portions blocked by the shield portions 20b, the optical slit array 20 can be caused to oscillate along the array axis (that is, parallel to the horizontal arrows in FIG. 5A) or the distance between the optical slit array 20 and the imaging surface 6 (that is, the distance in line with the vertical arrows in FIG. 5A) could be varied in a manner similar to the movement of the cylindrical lenses 10 described in FIGS. 4A, 4B, and, 4C to acquire multiple images from which viewing angle information can be extracted by an image data processing operation to achieve higher image resolution.

This embodiment of the invention uses an optical slit array, but other means providing the function of optical slits can be used instead. FIG. 5B, for example, shows a liquid crystal shutter 21 disposed in front of the imaging surface 6 having electrodes striped in one direction. This enables separating images from different viewing angles without using any moving parts by sequentially capturing the images lined up on the imaging surface 6 in a manner similar to moving the optical slit array 20.

Further alternatively, the width of the slit portions 21a (the parts of the liquid crystal shutter 21 controlled so that light transmittance is approximately 1) of the liquid crystal shutter 21 could also be variable. In this case, this width is narrowed when degree of image separation at each viewing angle is prior, and this width is increased when minimizing the loss of light energy is prior.

(Embodiment 3)

Figure 6A:
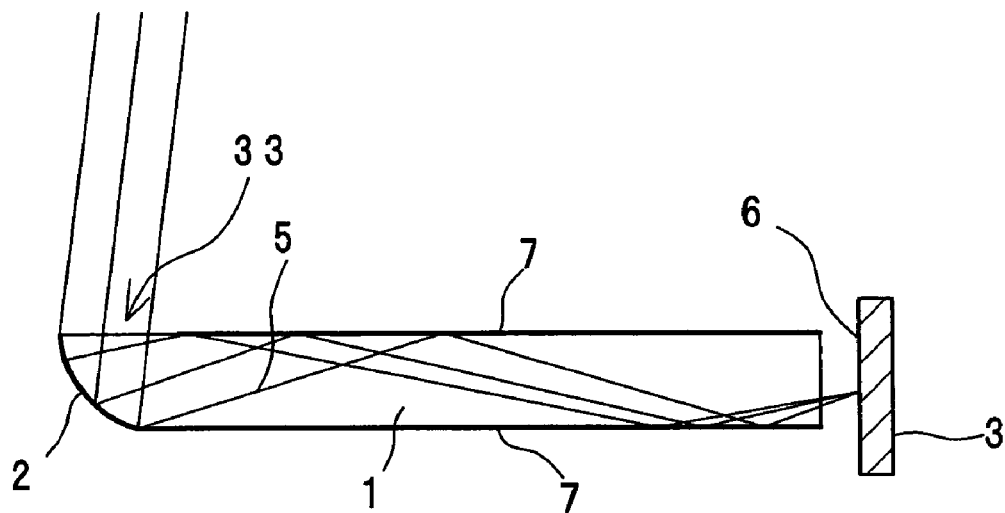
FIGS. 6A, 6B, and, 6C are section views of a thin imaging apparatus according to a third embodiment of the present invention.
Figure 6B:
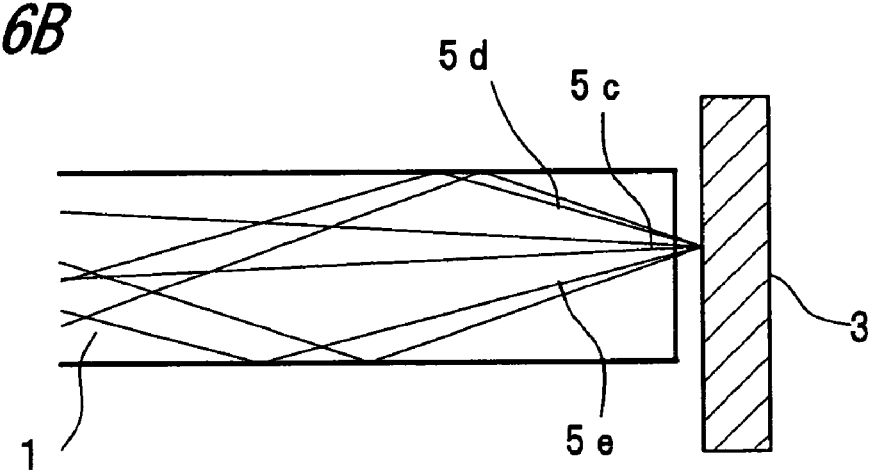

FIGS. 6A, 6B, and, 6C are section views showing a thin imaging apparatus according to a third embodiment of the present invention. As shown in FIG. 6A, the arrangement whereby light from the subject is reflected and guided by the incidence mirror 2 into the light guide 1 and then reflected by mirror surfaces 7 rendered on both main sides of the light guide 1 is the same as described in the foregoing first embodiment. This embodiment differs from the first embodiment, however, in that the emittance mirror 8 disposed in the first embodiment is not provided in this embodiment, and incident light guided to the end of the light guide 1 of imaging device side is received directly by the imaging device 3. The emittance mirror 8 in the first embodiment reflects the light to a main surface of the light guide 1 and thus makes disposing the imaging device 3 on the surface easier. Disposing the imaging device 3 as shown in FIG. 6A, however, affords both an extremely thin optical system and high resolution imaging without using an emittance mirror 8.

A method of separating image data from incident light 5 at different incidence angles in this third embodiment of the invention is described next with reference to FIGS. 6B and 6C.

FIG. 6B shows incident light 5c, 5d, and, 5e from different visual fields incident to the same pixel of the imaging device 3. Incident light from different visual fields cannot be separated in this case.

Figure 6C:
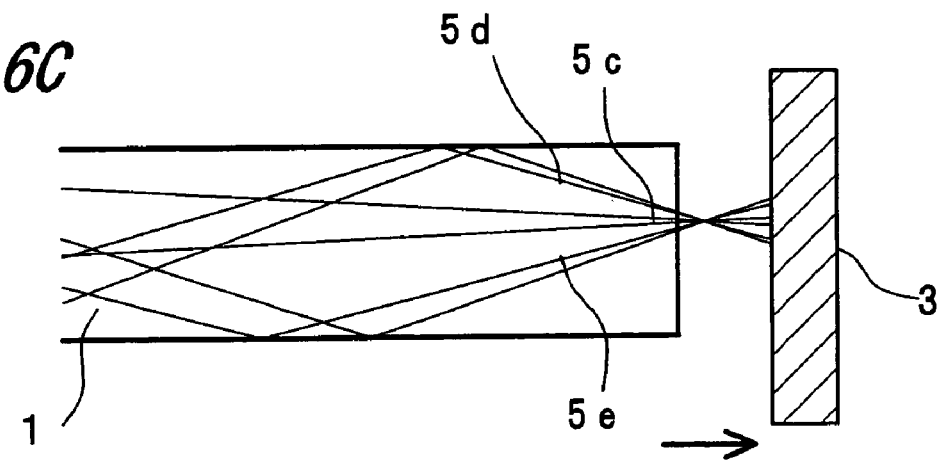

By changing the distance from the light guide 1 to the imaging device 3 as shown in FIG. 6C, however, incident light 5c, 5d, and, 5e from different visual fields that was focused on the same pixel at the distance shown in FIG. 6B is focused on different pixels at the distance shown in FIG. 6C.

Images from different viewing angles can thus be separated and the original image can be restored by an image data processing operation from plural images captured at different distances between the light guide 1 and imaging device 3.

(Embodiment 4)

Figure 7A:
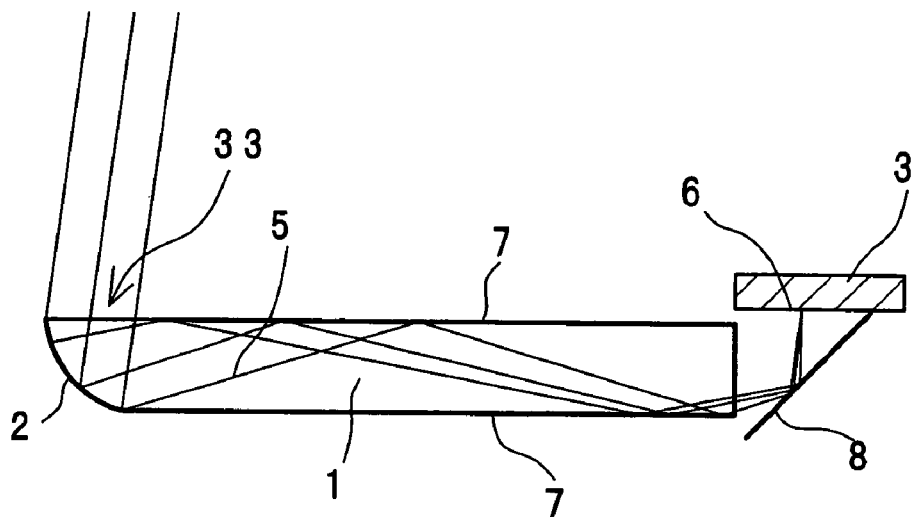
FIGS. 7A, 7B, and, 7C are section views of a thin imaging apparatus according to a fourth embodiment of the present invention.
Figure 7B:
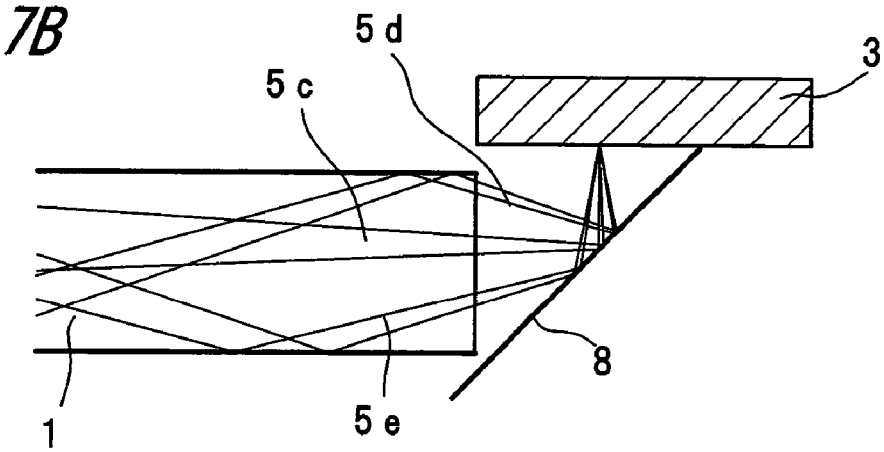

FIGS. 7A, 7B, and, 7C are section views showing a thin imaging apparatus according to a fourth embodiment of the present invention. As shown in FIG. 7A, the arrangement whereby light from the subject is reflected and guided by the incidence mirror 2 into the light guide 1 and then reflected by mirror surfaces 7 rendered on both main surfaces of the light guide 1 is the same as described in the foregoing first embodiment. This embodiment differs from the first embodiment, however, in that the emittance mirror 8 disposed in the first embodiment is disposed separated from the end of the light guide 1 on the imaging device 3 side. This emittance mirror 8 reflects the incident light 5 emitted from the light guide 1 onto the imaging device 3.

The method of separating image data from incident light 5 at different viewing angles in this fourth embodiment of the invention is described with reference to FIGS. 7B and 7C.

FIG. 7B shows incident light 5c, 5d, and, 5e from different visual fields incident to the same pixel of the imaging device 3. Incident light from different visual fields cannot be separated in this case.

Figure 7C:
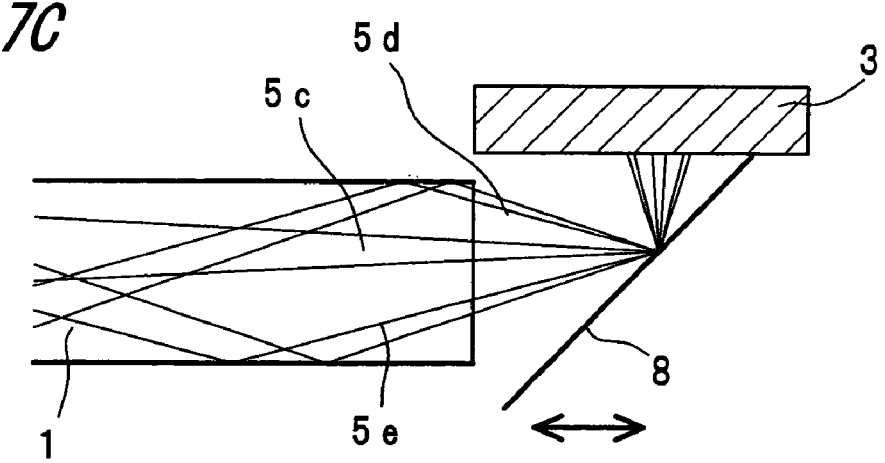

By changing the distance from the light guide 1 to the emittance mirror 8 as shown in FIG. 7C, however, incident light 5c, 5d, and, 5e from different visual fields that was focused on the same pixel at the distance shown in FIG. 7B is focused on different pixels at the distance shown in FIG. 7C.

Images from different viewing angles can thus be separated and the original image can be restored by an image data processing operation from plural images captured at different distances between the light guide 1 and emittance mirror 8.

The operating principle of this embodiment is the same as the operating principle of the third embodiment in which the imaging device 3 is moved. However, instead of moving the unit of imaging device 3, which has a complex structure having leads and a signal processing circuit, this embodiment of the invention only moves a lightweight and simple structural mirror, and hence the drive of the emittance mirror 8 is simplified.

(Embodiment 5)

Figure 8A:
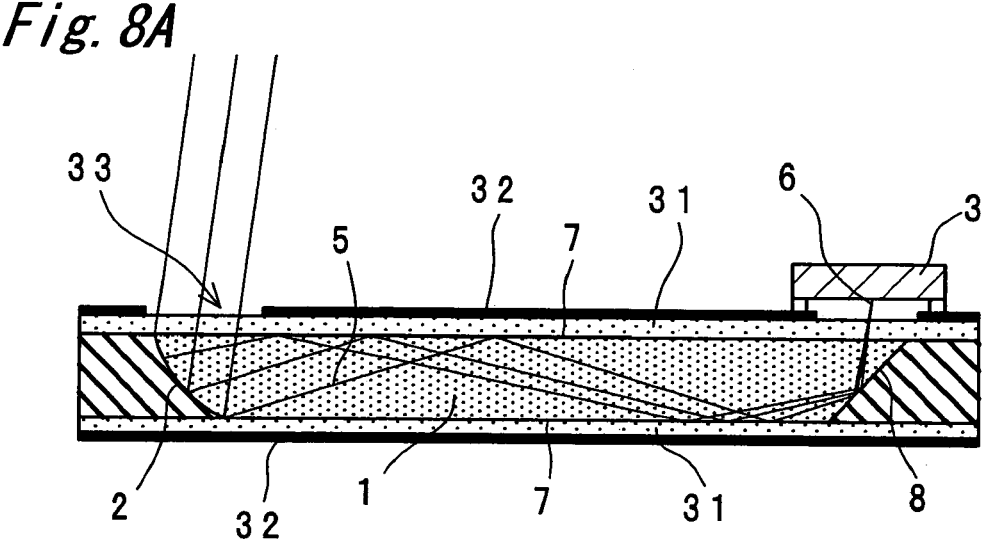
FIGS. 8A, 8B, and, 8C are section views of a thin imaging apparatus according to a fifth embodiment of the present invention.
Figure 8B:
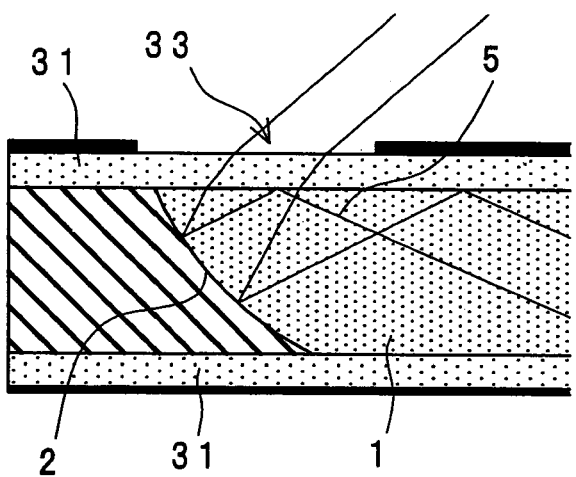

FIGS. 8A, 8B, and, 8C are section views showing a thin imaging apparatus according to a fifth embodiment of the present invention. The structure and operation of this fifth embodiment are described first with reference to FIG. 8A.

The arrangement whereby an incidence mirror 2 is disposed to one end and an imaging device 3 is disposed to the other end of the light guide 1 through which light passes, light from the subject is reflected by the incidence mirror 2 and introduced into the light guide 1, the guided incident light 5 is then collected and directed to the imaging surface 6 of the imaging device 3, and an image of the subject is thus captured is the same as in the foregoing first embodiment. The specific configuration of the mirror surfaces 7 disposed to both main surfaces of the light guide 1 for reflecting the incident light 5 in this embodiment of the invention differs from the configuration of the mirror surfaces 7 in the first embodiment.

This embodiment of the invention further disposes an external medium 31 having a refractive index different from the refractive index of the light guide 1 externally to the light guide 1. The refractive index (n1) of the medium composing the light guide 1 is greater than the refractive index (n2) of the external medium 31. When light rays are incident where a high refractive index material interfaces a low refractive index material, rays that are incident to the interface between the two materials at an incidence angle greater than a critical angle are totally reflected. This embodiment uses this optical characteristic to achieve the function of the mirror surfaces 7 at the interface between the light guide 1 and external medium 31. More specifically, the mirror surfaces 7 in this embodiment perform the same function as in the first embodiment, that is, totally reflecting incident light 5 reflected at a shallow angle (large incidence angle) inside the light guide 1 and thereby propagating the incident light 5 to the imaging device 3, and thus achieve the same effect in a thin imaging apparatus as in the first embodiment.

The mirror surfaces 7 in this embodiment also pass light incident at a smaller incidence angle than this critical angle through the mirror surface, and thus afford the following effect. First, the light path of the incident light 5 shown in FIGS. 8A, BB, and, 8C represent the light paths under ideal conditions, but an actual imaging environment is also exposed to random scattered light and incident light from unexpected directions, producing stray light. Much of this stray light is incident to the mirror surfaces 7 at unordered angles, and stray light at an incidence angle smaller than the critical angle does not meet the total reflection conditions determined by the refractive indices n1 and n2 of the materials, is therefore not reflected by the mirror surfaces 7 of this embodiment, and thus does not reach the imaging device 3. Propagation of extraneous light can thus be prevented. The light absorber 32 shown in FIG. 8A absorbs this extraneous light not reflected by the mirror surfaces 7, and also suppresses propagation of scattered light and other extraneous light.

Another new effect of the mirror surfaces 7 in this embodiment is described with reference to FIGS. 8B and 8C. FIG. 8B is an enlarged section view of the area around the incidence mirror 2 in this embodiment, and FIG. 8C is an enlarged section view of the area around the emittance mirror 8.

Referring to FIG. 8B, incident light from the subject enters from an external medium 31 with a lower refractive index to a light guide 1 made from a higher refractive index material. The light is thus refracted at the interface between these materials as the light passes through, is reflected by the incidence mirror 2 and reflected in a direction forming a shallow angle with the mirror surface 7. The light is thus reflected by the mirror surface 7 and propagated through the light guide 1. The mirror surface 7 can thus also be rendered in the area of the aperture unit 33 on the incidence end of the light guide 1, light from the outside passes through the mirror surface 7, and the incident light 5 reflected by the incidence mirror 2 is reflected by the mirror surface 7 even in the aperture unit 33 and is guided into the light guide 1.

Figure 8C:
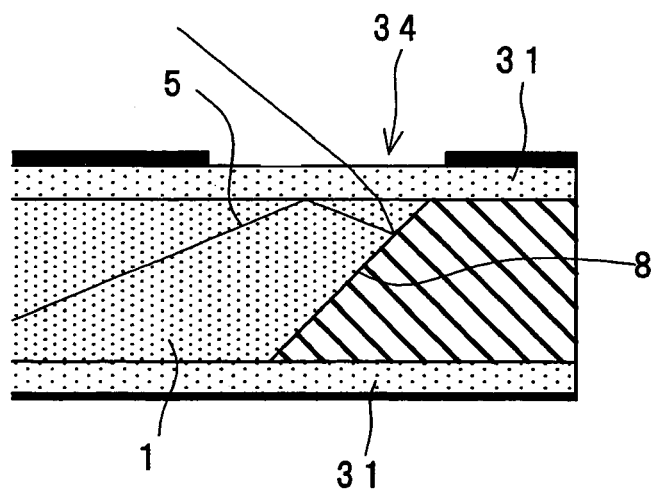

Likewise as shown in FIG. 8C, the mirror surface 7 can be also be rendered in the aperture 34 on the imaging device 3 end of the light guide 1. Incident light 5 propagated through the light guide 1 is incident to the mirror surface 7 at an angle greater than the critical angle, is thus totally reflected to the emittance mirror 8, and light reflected by the emittance mirror 8 is incident to the mirror surface 7 at an angle less than the critical angle and thus passes through the interface and reaches the imaging device 3.

Fluoropolymers are one type of material that can be used for the external medium 31. Fluoropolymers have a refractive index n of approximately 1.34, and the refractive index can be controlled by controlling the degree of fluorination. The material of the external medium 31 shall not be so limited, however, and any material with a lower refractive index than the refractive index n1 of the light guide 1 medium can be used.

The materials used for the light guide 1 and the external medium 31 are preferably selected so that the square of the refractive index n2 of the external medium 31 is near the refractive index n1 of the light guide 1 in order to better prevent reflection of incident light 5. To further prevent reflection of incident light 5, the optical distance through the thickness of the external medium 31 is preferably approximately ¼, ¾, . . . , or, $(2n-1)/4$ (where n is a natural number) of the wavelength 1 of the incident light 5.

The wavelength of visible light ranges from approximately 400 to 700 nm. Therefore, using the median wavelength of 550 nm by way of example, the thickness of the external medium 31 preferably has an optical distance of approximately 140 nm, 410 nm, and so forth in order to prevent reflection of incident light 5. Furthermore, because light leaks to the external medium 31 even if incident light 5 traveling inside the light guide 1 is reflected at the interface, locating the light absorber 32 at a distance shorter than the wavelength of the light could result in light loss. As a result, sufficient thickness in the external medium 31 is preferable in order to prevent the loss of light resulting from light leakage.

In addition to the benefits afforded by the first embodiment, this embodiment of the invention also suppresses propagation of extraneous light and thus suppresses the effects of random external light and light scattering.

Furthermore, disposing a mirror surface 7 in the apertures on both the incidence and emission ends of the light guide 1 enables optically efficient imaging and good quality photography.

The external medium 31 of the light guide 1 need not be filled with an optical material in this embodiment of the invention, and could be a hollow (air). Because the refractive index of air is substantially equal to the refractive index of a vacuum and thus $n2=1$, the condition that $n1>n2$ can be met and mirror surfaces 7 can be formed by using an optical medium in the light guide 1.

(Embodiment 6)

FIGS. 9A, 9B, 9C, 9D, and, 9E are section views showing a thin imaging apparatus according to a sixth embodiment of the present invention. The structure and operation of this embodiment are described with reference to FIGS. 9A, 9B, 9C, 9D, and, 9E.

Figure 9A:
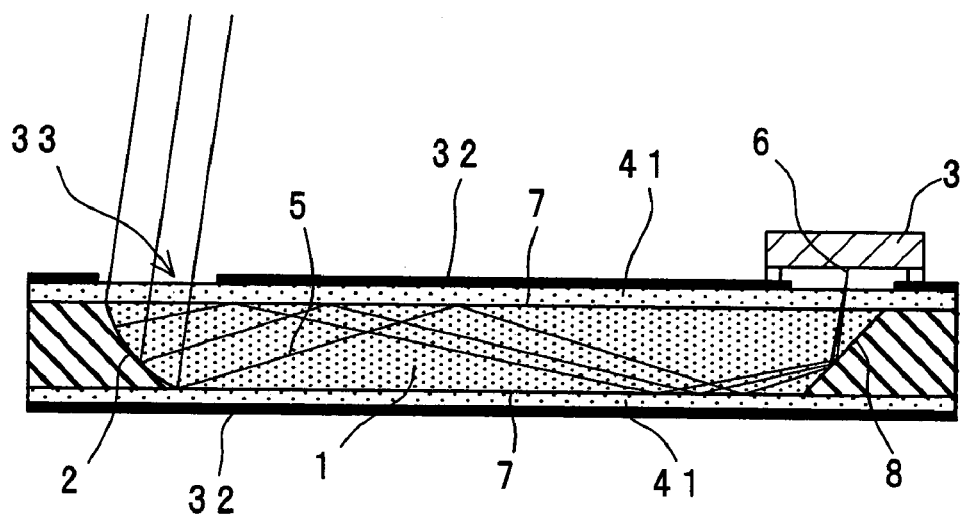
FIGS. 9A, 9B, 9C, 9D, and, 9E are section views of a thin imaging apparatus according to a sixth embodiment of the present invention.

The elements shown in the arrangement in FIG. 9A are identical to the corresponding elements shown in the arrangement of the fifth embodiment shown in FIG. 8A, and by making the refractive index (n1) of the medium used for the light guide 1 greater than the refractive index (n2) of the external medium 41, incident light 5 meeting the total reflection conditions is reflected due to the difference in the refractive indices of the optical media, and mirror surfaces 7 are thus achieved.

This embodiment differs from the fifth embodiment in that a medium 41 enabling changing the refractive index n2 is used as the external medium, and the incident light 5 can thus be selectively reflected or not reflected by controlling the refractive index so that $n2<n1$ when reflecting the incident light 5 is desirable, and so that $n2>=n1$ when reflecting the incident light 5 is not desirable. A liquid crystal material can be used as this material with liquid crystal drive electrodes formed in stripes (not shown) used to change the refractive index so that reflection of the incident light 5 is turned on and off in selected parts. This enables acquiring viewing angle information from the incident light using a different method than the preceding embodiments as described below with reference to FIGS. 9B, 9C, 9D, and, 9E. Note that in FIGS. 9B, 9C, 9D, and, 9E reference numeral 42 denotes the portion of the external medium 41 that is controlled to reflect the incident light (that is, is set to the reflecting mode).

The incident light 5 that reaches the imaging device 3 directly without being reflected by the mirror surfaces 7 inside the light guide 1 is guided continuously to the imaging device 3. As a result, subjects in the visual field from which incident light is guided directly to the imaging device 3 are imaged by the imaging device 3 even if the mirror surfaces 7 on both sides of the light guide 1 are set to the non-reflecting mode.

Figure 9B:
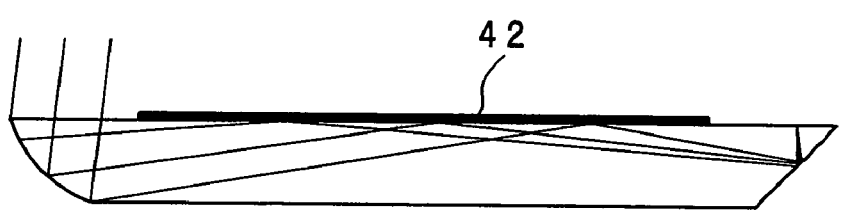

For incident light that is guided through the light guide 1 by a single reflection from the mirror surface 7 on one side of the light guide 1, the mirror surface 7 on that one side is set to the reflecting mode (42) as shown in FIG. 9B. As a result, the imaging device 3 images both the incident light conducted directly thereto without reflection and the incident light guided thereto by this single reflection from the mirror surface 7. Incident light from other visual fields is not guided to the imaging device 3 unless reflected by the other mirror surface 7, which is set to the non-reflecting mode, and thus does not reach the imaging device 3. As a result, image data from the visual field guided to the imaging device 3 by a single reflection can be acquired by subtracting the image data formed by directly transmitted light from the overlapping image data formed by the imaging device 3 from both direct and reflected light.

Figure 9C:
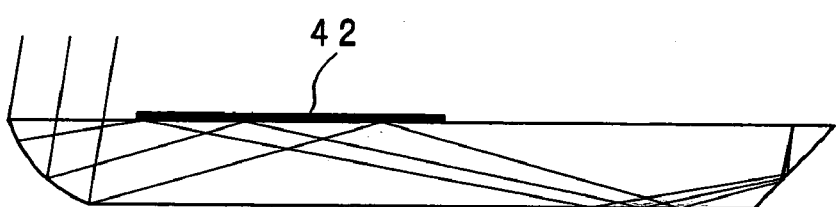
Figure 9D:
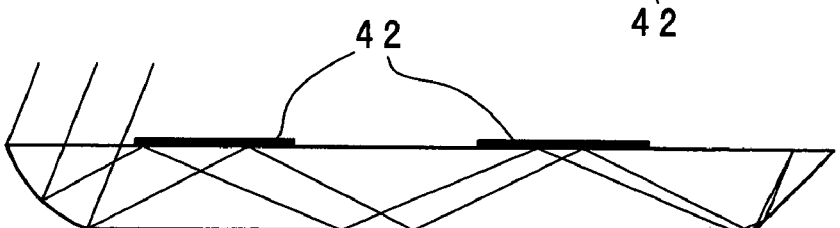
Figure 9E:
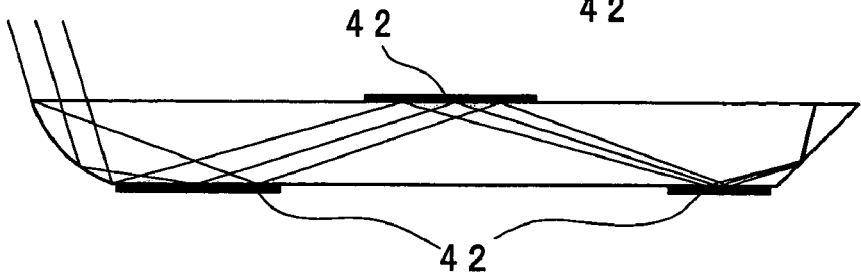

Whether the light is reflected twice inside the light guide 1 as indicated in FIG. 9C or three or more times as shown in FIGS. 9D and 9E, the reflection pattern is specific to each of the corresponding visual fields. As a result, image data for a specific visual field can be extracted by similarly controlling the reflecting/non-reflecting mode of the mirror surfaces 7 according to the desired visual field. Images from visual fields requiring even more reflections can likewise be captured by sequential differentiation of the image data.

By thus differentiating visual field data, image data can be easily captured for specific viewing angles without disposing an optical viewing angle differentiation means in front of the imaging device 3 and without using any moving parts such as oscillating lenses or slits.

The magnitude relation between the refractive index n1 of the light guide 1 and the refractive index n2 of the external medium 41 is varied in this embodiment by controlling the refractive index n2 of the external medium 41. The critical angle enabling total reflection of light at the interface can be changed in multistage and thus used to differentiate the image data by using for the external medium 41 a material of which the refractive index n2 can be controlled in multistage.

The reflecting/non-reflecting mode of the mirror surfaces 7 is controlled in this embodiment of the invention by changing the refractive index of a liquid crystal medium, but the same effect can be achieved using other methods of locally controlling whether light is reflected or not reflected.

(Embodiment 7)

Figure 10A:
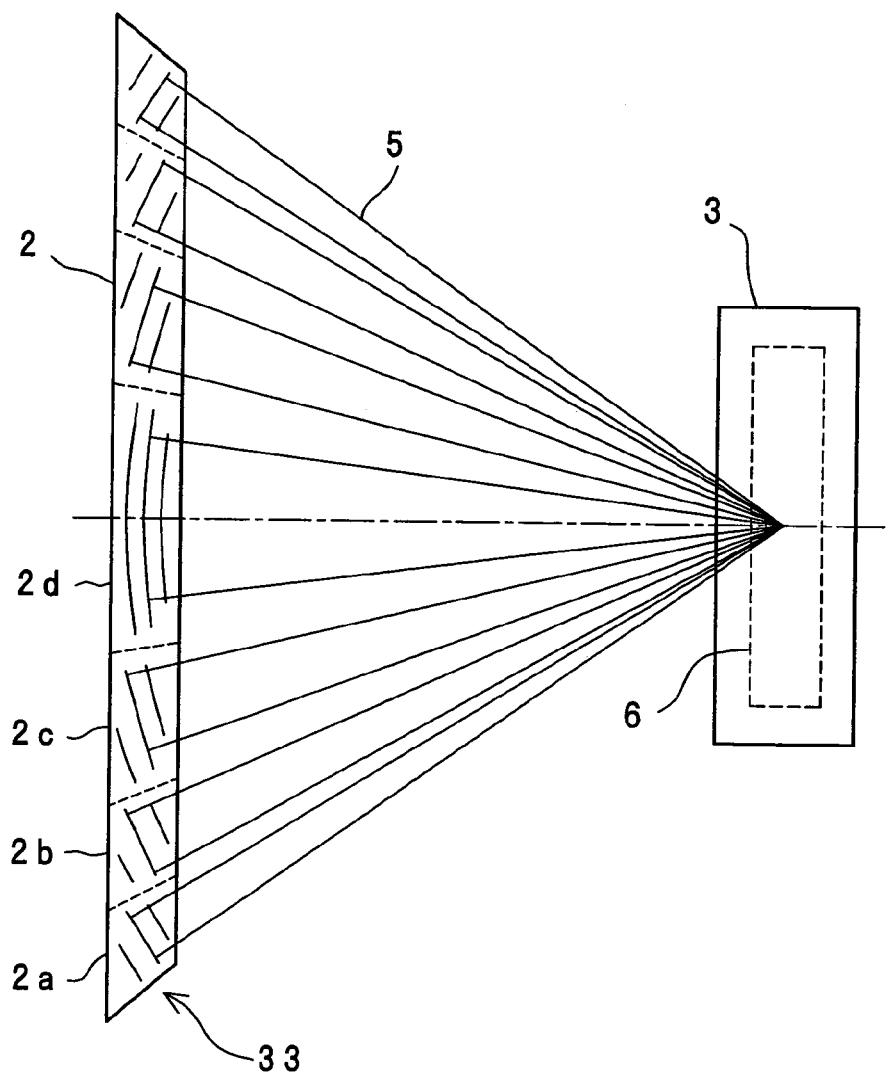
FIG. 10A is a top view of a thin imaging apparatus according to a seventh embodiment of the present invention.
Figure 10B:
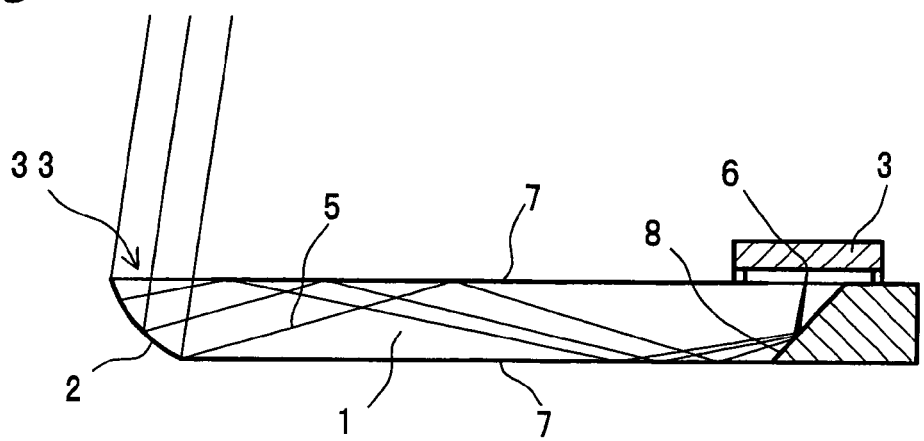
FIG. 10B is a section view of a thin imaging apparatus according to a seventh embodiment of the present invention.

FIGS. 10A and 10B are views showing a thin imaging apparatus according to a seventh embodiment of the present invention. The structure and operation of this embodiment are described with reference to FIGS. 10A and 10B schematically showing the relationship between the incidence mirror 2 and the imaging surface 6 of the imaging device 3. FIG. 10A is a top view of an imaging apparatus according to this embodiment of the invention as seen from the side to which light from the subject is incident, and FIG. 10B is a section view.

The arrangement of this embodiment is basically the same as the first embodiment, differing in the configuration of the incidence mirror 2. The incidence mirror 2 in the first embodiment has a curved arc shape as shown in FIG. 1A, but in this embodiment of the invention the incidence mirror 2 is composed of a plurality of mirror parts 2a, 2b, and so forth each having a same or different curvature. The radius of curvature of the surface of the mirror parts 2a, 2b, and so forth increases with distance from the central axis of the mirror part, and the curvature and reflection direction of each of the mirror parts 2a, 2b, and so forth are controlled so that light incident to each surface of the curved parts 2a, 2b, and so forth is collected at the middle of the imaging surface 6.

Thus constructing the incidence mirror 2 using a plurality of mirror parts having a different surface curvature in the individual mirror parts 2a, 2b, and so forth and aligning the focal point of each of the individual parts to the same point affords a bright light-gathering optical system with a long aperture and high numerical aperture that cannot be achieved using a single curved mirror. In addition, the aperture unit of the incidence mirror 2 can be arrayed in a straight line as shown in FIG. 10A.

(Embodiment 8)

Figure 11A:
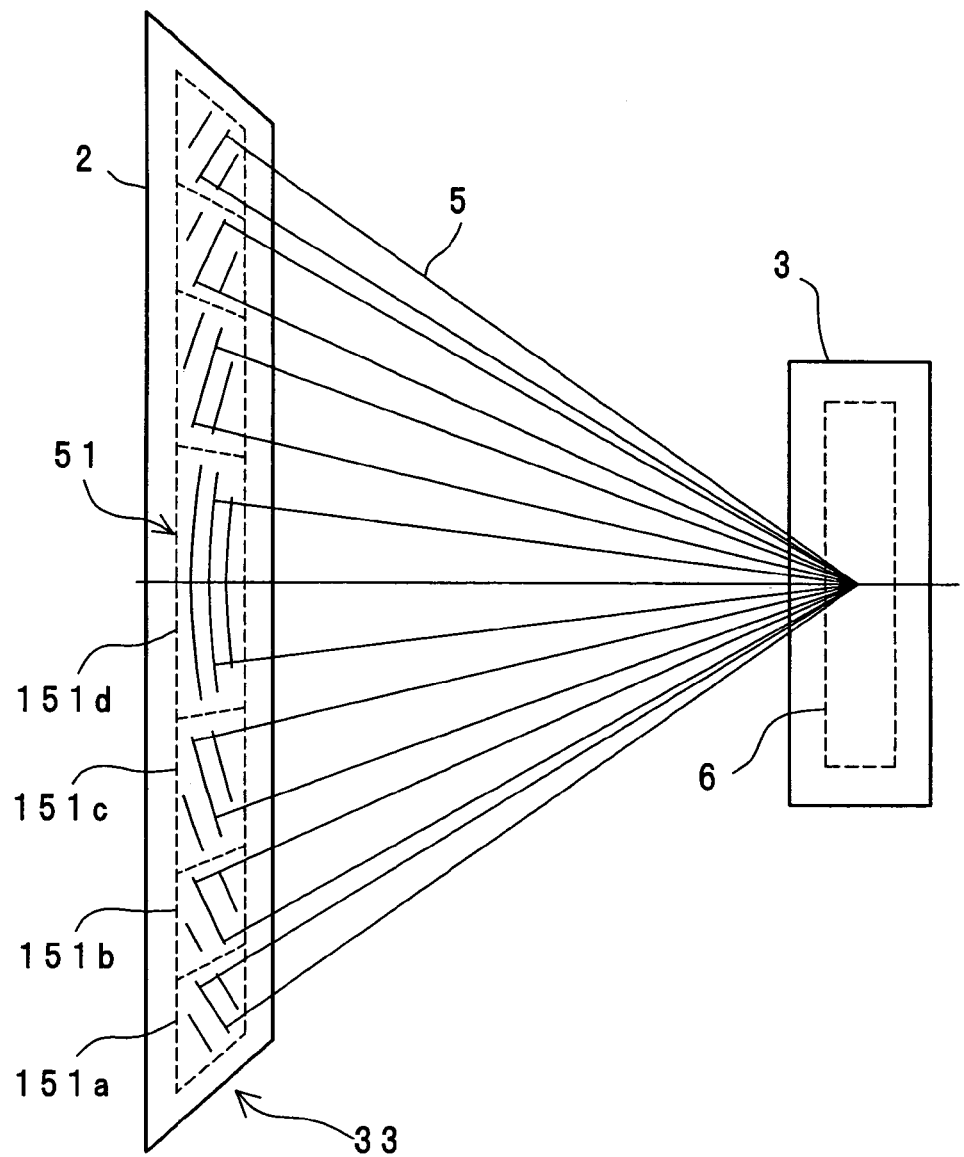
FIG. 11A is a top view of a thin imaging apparatus according to an eighth embodiment of the present invention.
Figure 11B:
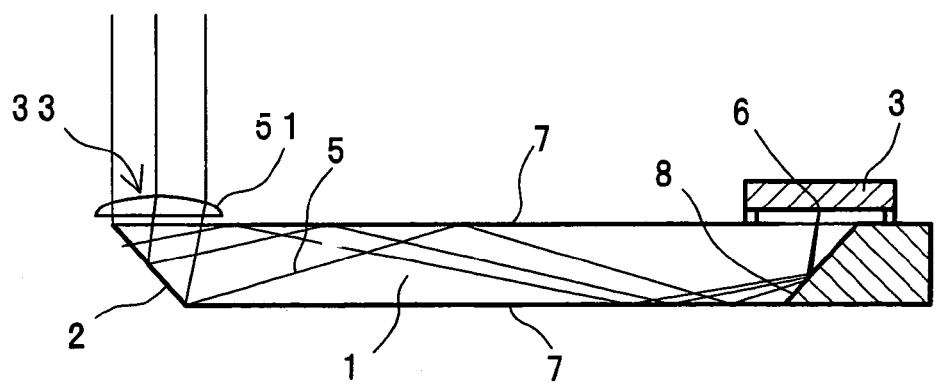
FIG. 11B is a section view of a thin imaging apparatus according to an eighth embodiment of the present invention.

FIGS. 11A and 11B are a top view and a section view showing a thin imaging apparatus according to an eighth embodiment of the present invention. The structure and operation of this embodiment are described with reference to FIGS. 11A and 11B. FIG. 11A is a top view of an imaging apparatus according to this embodiment of the invention as seen from the side to which light from the subject is incident, and FIG. 11B is a section view.

The basic configuration is the same as in the first embodiment. This embodiment differs in providing a collector lens 51 for gathering incident light from the subject in front on the subject side of the incidence mirror 2. The arrangement shown in FIGS. 11A and 11B uses flat plane mirrors for the incidence mirror 2 and uses the collector lens 51 for light gathering. Similarly to the incidence mirror 2 in the seventh embodiment, the surface curvature of the collector lens 51 is divided into a plurality of segments 151a, 151b, and so forth which are arranged to focus at the same position. The curvature of the plural segments 151a, 151b, and so forth of the collector lens 51 could be different on the longitudinal direction and width direction of the collector lens 51, or the curvature could be the same. Insofar as light passing each part of the collector lens 51 is collected at a specific focal point, any type of lens can be used. Thus segmenting the collector lens 51 helps reduce the thickness of the collector lens 51, and enables reducing the thickness of the imaging apparatus without rendering a collector function in the incidence mirror 2.

A light-gathering path can thus be formed through the length of the light guide 1 without imparting a collector function to the incidence mirror 2. A thin collector lens 51 having a long focal length can thus be used, and images can be captured with higher resolution than conventionally.

The incidence mirror 2 is a plane mirror in this embodiment of the invention, but the collector lens 51 and incidence mirror 2 could alternatively both be curved mirrors arranged to form complementary collector optics. For example, if the incidence mirror 2 is an arc shape disposed to gather light in the direction parallel to the main surface of the light guide 1, and the collector lens 51 is designed to gather light in the direction perpendicular to the main surface of the light guide 1, the collector lens 51 could be a cylindrical lens with a convex curved surface only in the width direction to the aperture unit 33. A thin, low profile collector lens 51 can thus be easily achieved.

(Embodiment 9)

Figure 12A:
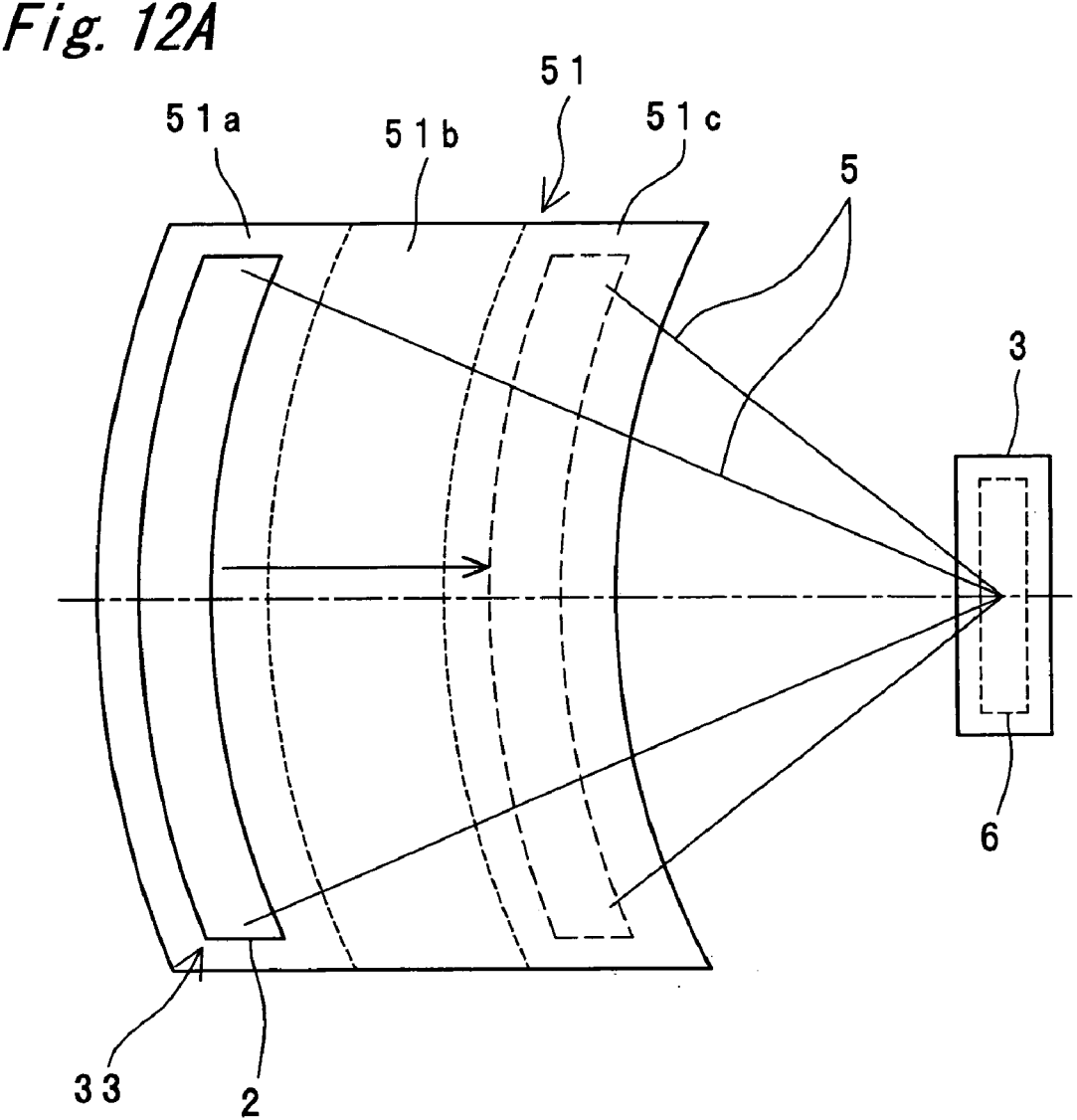
FIG. 12A is a top view of a thin imaging apparatus according to a ninth embodiment of the present invention.
Figure 12B:
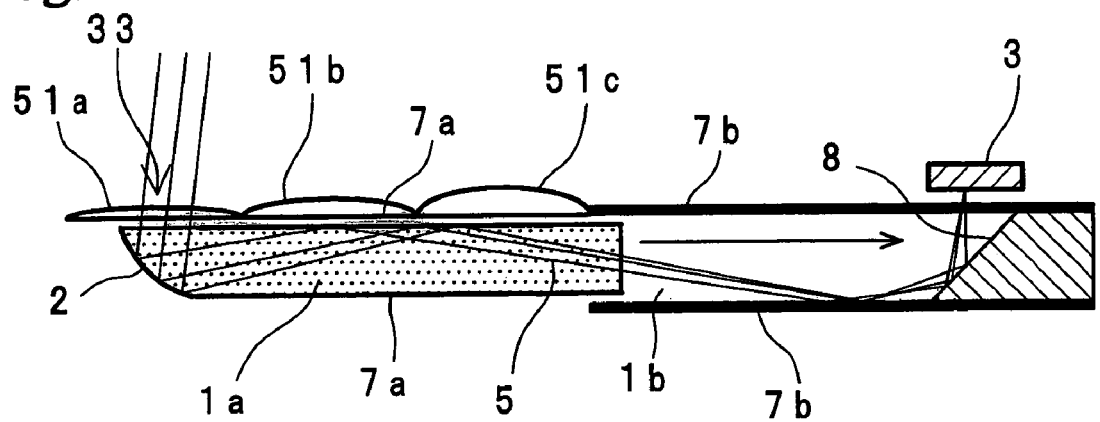
FIG. 12B is a section view of a thin imaging apparatus according to a ninth embodiment of the present invention.

FIGS. 12A and 12B are a top view and a section view showing a thin imaging apparatus according to a ninth embodiment of the present invention. The structure and operation of this embodiment are described with reference to FIGS. 12A and 12B. FIG. 12A is a top view of an imaging apparatus according to this embodiment of the invention as seen from the side to which light from the subject is incident, and FIG. 12B is a section view.

The basic arrangement of this embodiment is the same as in the eighth embodiment with a collector lens 51 disposed in front of the incidence mirror 2. In this embodiment, however, the light guide 1 is composed of light guide 1a and light guide 1b. Mirror surfaces 7a are formed on both main surfaces of light guide 1a. The incidence mirror 2 is fixed at one end of light guide 1a, and incident light 5 collected by the incidence mirror 2 is reflected and guided by the mirror surfaces 7a. The other light guide 1b is a hollow space rendered between mirror surfaces 7b on both main surfaces thereof. The incident light 5 guided thereto from the light guide 1a is reflected and guided by the mirror surfaces 7b to the imaging device 3.

By thus using a hollow between mirror surfaces 7b as a light guide, the incidence mirror 2 can be moved along the collection axis as indicated by the arrows in FIGS. 12A and 12B. Thus moving the incidence mirror 2 enables adjusting the distance between the incidence mirror 2 and imaging device 3, thus enabling adjusting the focus according to the subject distance and imaging higher quality pictures. Although not shown in the figure, the focus can also be adjusted and high quality pictures can be captured even if the incidence mirror 2 is stationary and the imaging device 3, emittance mirror 8, and other parts are movable.

The collector lens 51 disposed in front of the incidence mirror 2 is segmented into a plurality of areas (lenses) 51a, 51b, and 51c. As a result, the lens directing subject light onto the incidence mirror 2 can be changed by moving the incidence mirror 2. By rendering lenses 51a, 51b, and 51c with different focal lengths, a zoom function can be achieved by positioning the incidence mirror 2 to a lens with a different focal length. In the example shown in FIGS. 12A and 12B collector lens 51a is used for telephoto, lens 51b for normal, and lens 51c for wide angle imaging. Furthermore, the focus can also be adjusted by moving the incidence mirror 2 within the area of the selected lens 51a, 51b, or, 51c, thus enabling adjusting both the focal length (zoom) and focus.

The collector lens 51 is divided into three stages in this example, but could be divided into more stages to achieve a nearly continuous zooming function.

The focus is adjusted in this embodiment by moving the incidence mirror 2. Because the focus is adjusted by adjusting the distance between the incidence mirror 2 and imaging device 3, however, the imaging device 3 could alternatively be moved to adjust the focus. If the focus is adjusted by moving the imaging device 3, moving the incidence mirror 2 is used primarily for zooming. As a result, the number of segments in the collector lens can be increased to achieve a smoother zoom function.

In this embodiment the surface of the incidence mirror 2 is also curved and light is collected using both the incidence mirror 2 and collector lens 51. In the example shown in FIGS. 12A and 12B the surface of the incidence mirror 2 is disposed in an arc to gather light at the focal length of the visual field at the longest telephoto position, and the collector lens 51a at the longest telephoto position is simply flat glass and is not used for collection. It is therefore not necessary to provide curvature in the area of collector lens 51a, and a thinner profile can thus be achieved. The focal length becomes shorter as the visual field becomes wider and lenses with a large curvature are therefore needed in the collector lenses 51b and 51c at shorter focal lengths. However, by imparting a collector function to the surface of the incidence mirror 2, the curvature of the collector lens 51b and 51c can be reduced, the thickness of the overall collector lens system can be reduced, and a thin imaging apparatus can thus be achieved.

The mirror surface 7a moves in conjunction with the incidence mirror 2 in this embodiment of the invention. However, because the mirror surface 7a covers the opening to the other collector lenses 51b and 51c when the incidence mirror 2 is positioned to pick up light from collector lens 51a, the mirror surface 7a blocks extraneous outside light while also functioning to reflect and guide incident light 5 inside the light guide 1a.

(Embodiment 10)

Figure 13:
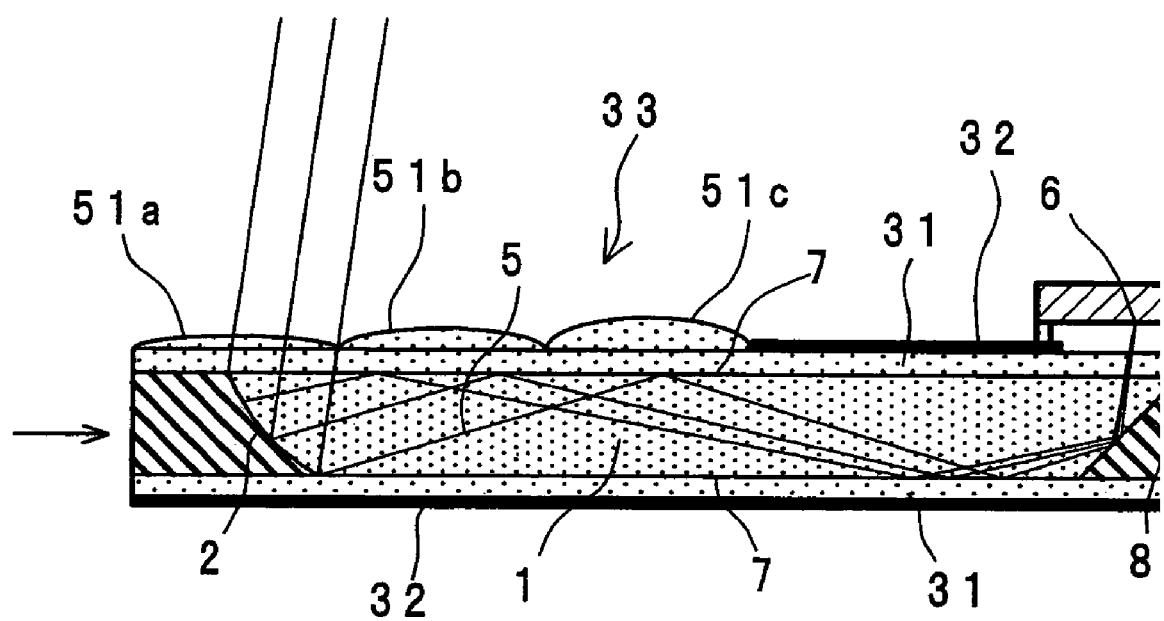
FIG. 13 is a section view of a thin imaging apparatus according to a tenth embodiment of the present invention.
Figure 14:
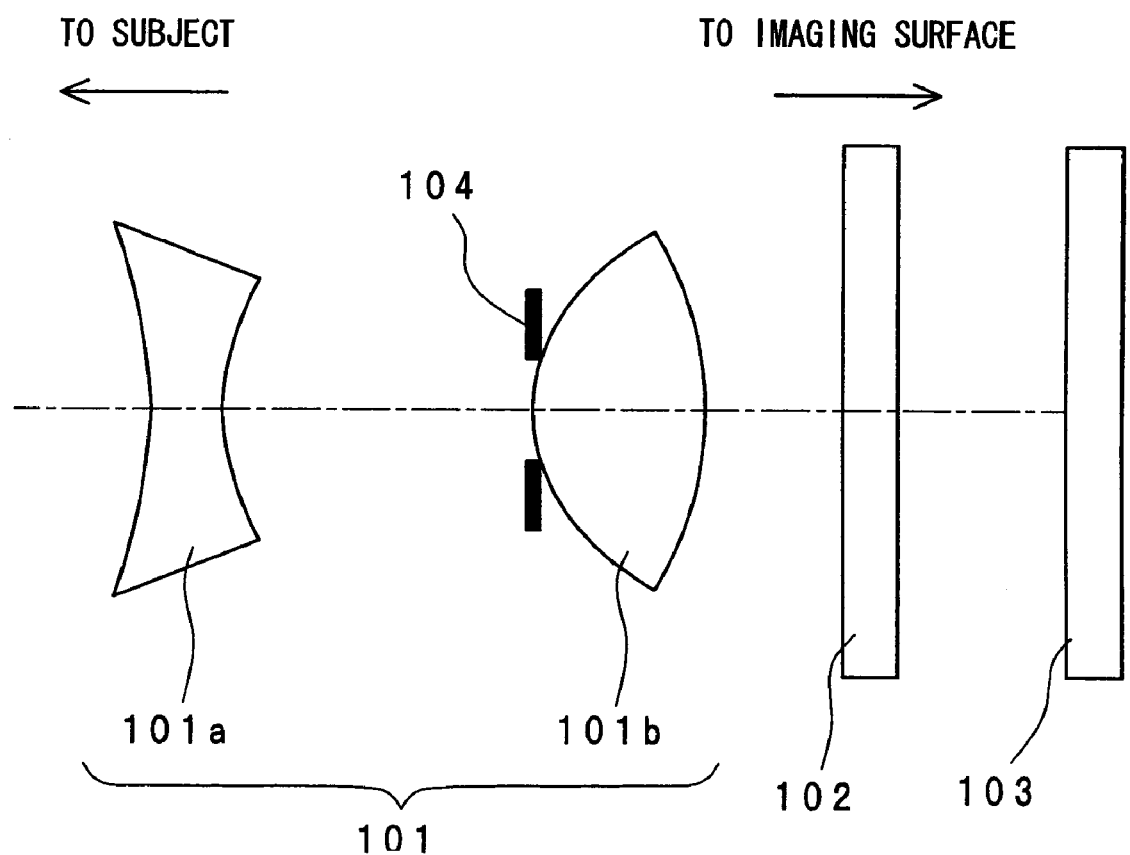
FIG. 14 is a section view of an imaging apparatus according to the prior art.

FIG. 13 is a section view showing a thin imaging apparatus according to a tenth embodiment of the present invention.

The basic arrangement of this embodiment is similar to the fifth embodiment. Specifically, the mirror surfaces 7 of the light guide 1 are rendered by the difference in the refractive indices of the external medium 31 and the medium inside the light guide 1, and a light absorber 32 is disposed externally to the external medium 31 to absorb extraneous light.

In this embodiment, however, the light guide 1 has a liquid medium filling the space between the external medium 31 on both sides, and the mirror surfaces 7 are achieved by filling the light guide 1 with a liquid having a refractive index higher than the refractive index of the external medium 31. This enables moving the block constituting the incidence mirror 2 inside the light guide 1.

If the external medium 31 is made from an optical polymer such as a fluoropolymer having a low refractive index, a common organic oil or silicon oil, for example, can be used as the liquid filler. Optical silicon oil from Shin-Etsu Silicon, for example, has a refractive index of approximately 1.47. Standard refractive index liquid from Cargille-Sacher Laboratories Inc. is an example of a liquid with a higher refractive index, and their Series B liquid has a refractive index of approximately 1.7, for example.

As in the ninth embodiment, collector lenses composed of multiple areas 51a, 51b, and 51c are disposed in front of the incidence mirror 2, and zoom and focusing functions as described in the ninth embodiment can be achieved by moving the incidence mirror 2 inside the light guide 1.

Because mirrors are achieved by means of the difference in refractive indices, segmenting the light guide 1 as in the ninth embodiment is not necessary, a mirror surface 7 can be rendered in the aperture where the collector lens is disposed, and which collector lens 51a, 51b, or 51c is used can be controlled by moving the incidence mirror 2 to the desired collector lens unit (51a, 51b, or 51c). As shown in the figure, for example, light incident to the collector lens 51a can be guided into the light guide 1 and reflected and guided by the mirror surface 7 to the imaging device 3 for imaging even in the aperture 33 to the collector lenses 51b and 51c while extraneous light is absorbed by the light absorber 32 or passed externally from the light guide 1.

(Embodiment 11 (Card Camera))

Figure 15:
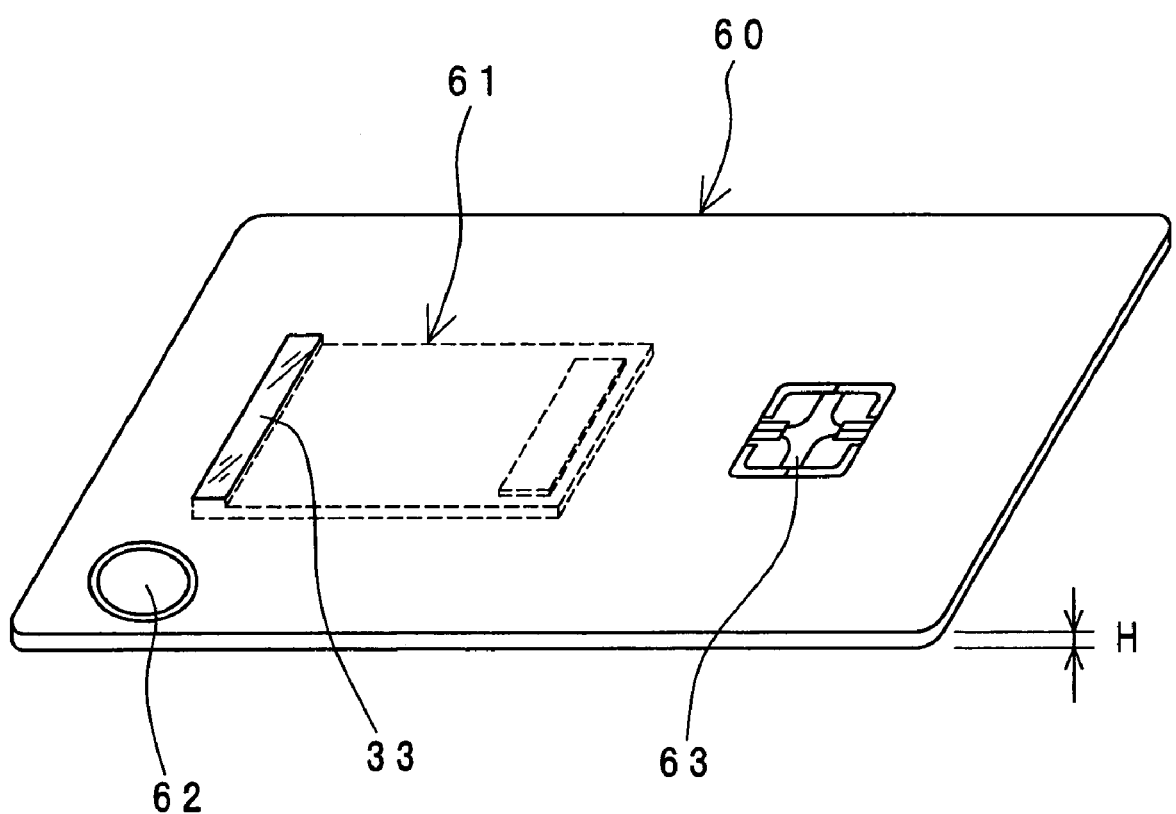
FIG. 15 is an oblique view of a card camera according to an eleventh embodiment of the present invention.

FIG. 15 is an oblique view of a card camera 60 using a thin imaging apparatus according to a preferred embodiment of the invention. More specifically, any of the foregoing thin imaging apparatuses can be used as the imaging apparatus 61 in a card camera 60 according to this embodiment of the invention. A thin imaging apparatus according to the sixth embodiment of the present invention as shown in FIGS. 9A, 9B, 9C, 9D, and 9E is used by way of example in this embodiment of the invention.

This card camera 60 is thickness H (where 0.5 mm<=H<=3.0 mm approximately) and the length and width are substantially the same as a common credit card. These dimensions make the card camera 60 highly portable and easy to store and carry. The shape and dimensions of this camera 60 shall not be so limited, however.

The card camera 60 has an internal imaging apparatus 61 with the aperture unit 33 externally exposed in order to pick up light. A shutter release button 62 and external interface 63 are disposed on the surface of the card camera 60. The user presses the shutter release button 62 to take a picture. Image data (pictures) captured by the camera and stored to internal memory (not shown in the figure) can be transferred to a data processing apparatus (not shown in the figure) by connecting the data processing apparatus to the external interface 63. The shutter release button 62 can be achieved using a common pressure sensor. The interface 63 can be a contact-type interface 63 or a noncontact interface.

Figure 16:
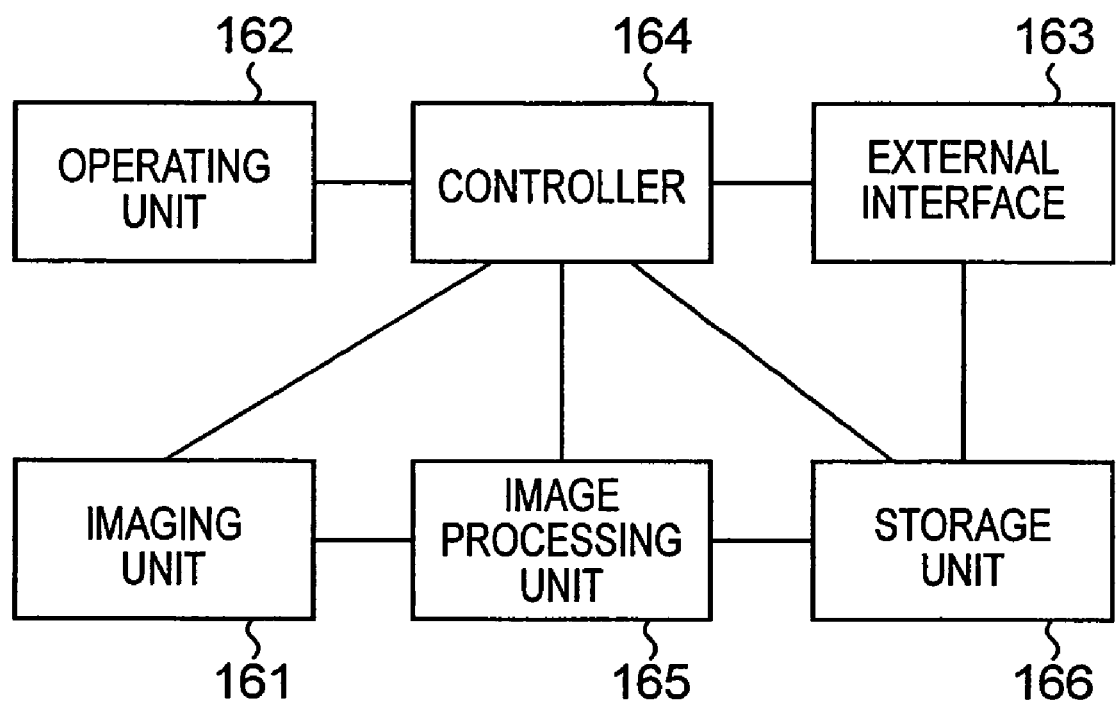
FIG. 16 is a block diagram of a card camera according to an eleventh embodiment of the present invention.

FIG. 16 is a block diagram of this camera 60. The operating unit 162, which includes the shutter release button 62 (FIG. 15), is connected to the controller 164. In addition to the operating unit 162, the controller 164 is connected to the imaging unit 161, image data processing unit 165, storage unit 166, and external interface 163. The controller 164 has an internal processor and memory, and can run the programs required to control this camera.

The imaging unit 161, which includes the imaging apparatus 61, captures images as controlled by the controller 164. The captured image data is sent to the image data processing unit 165. The image data processing unit 165 processes the received image data as controlled by the controller 164. The processed image data is then sent to and stored in the storage unit 166. The stored image data can also be output to an external device through the external interface 163 as controlled by the controller 164.

The storage unit 166 is preferably nonvolatile memory.

Figure 17:
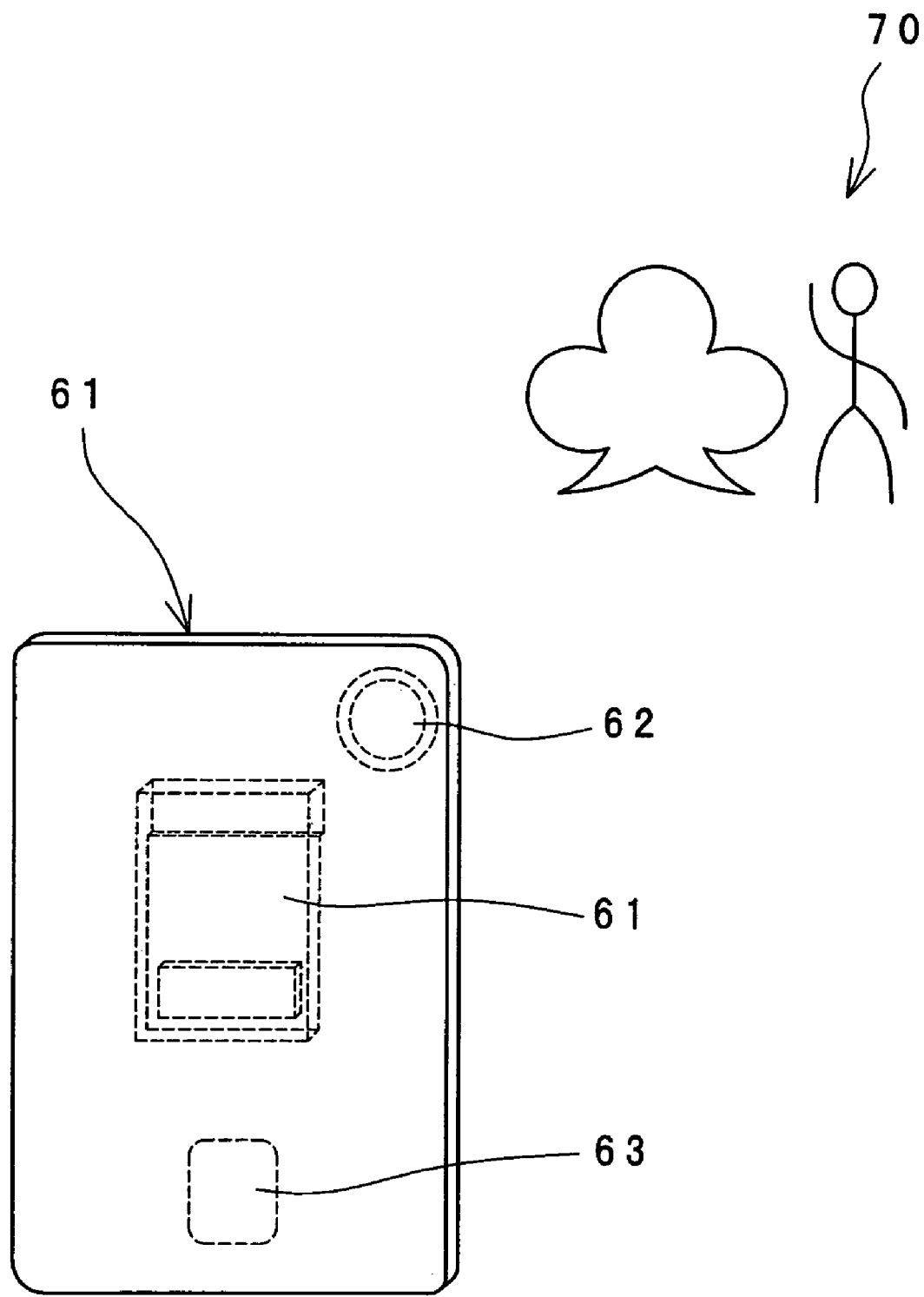
FIG. 17 shows taking a picture using a card camera according to an eleventh embodiment of the present invention.

FIG. 17 shows a picture of a subject 70 captured using this camera 60. A user (not shown in the figure) points the aperture unit 33 toward the subject 70 and then presses the shutter release button 62 with a finger, thereby taking a picture. A finder can also be provided for the user's convenience by providing a window (not shown in the figure) in the camera 60 through which light can pass.

When the shutter release button 62 is pressed, the camera 60 captures an image of the subject 70. The imaging unit 161 converts optical image information from the subject 70 to electric signals and the image data (image information) represented by these electric signals is processed by the image data processing unit 165, that is, is converted to digital image data which is then stored to the storage unit 166.

Figure 18:
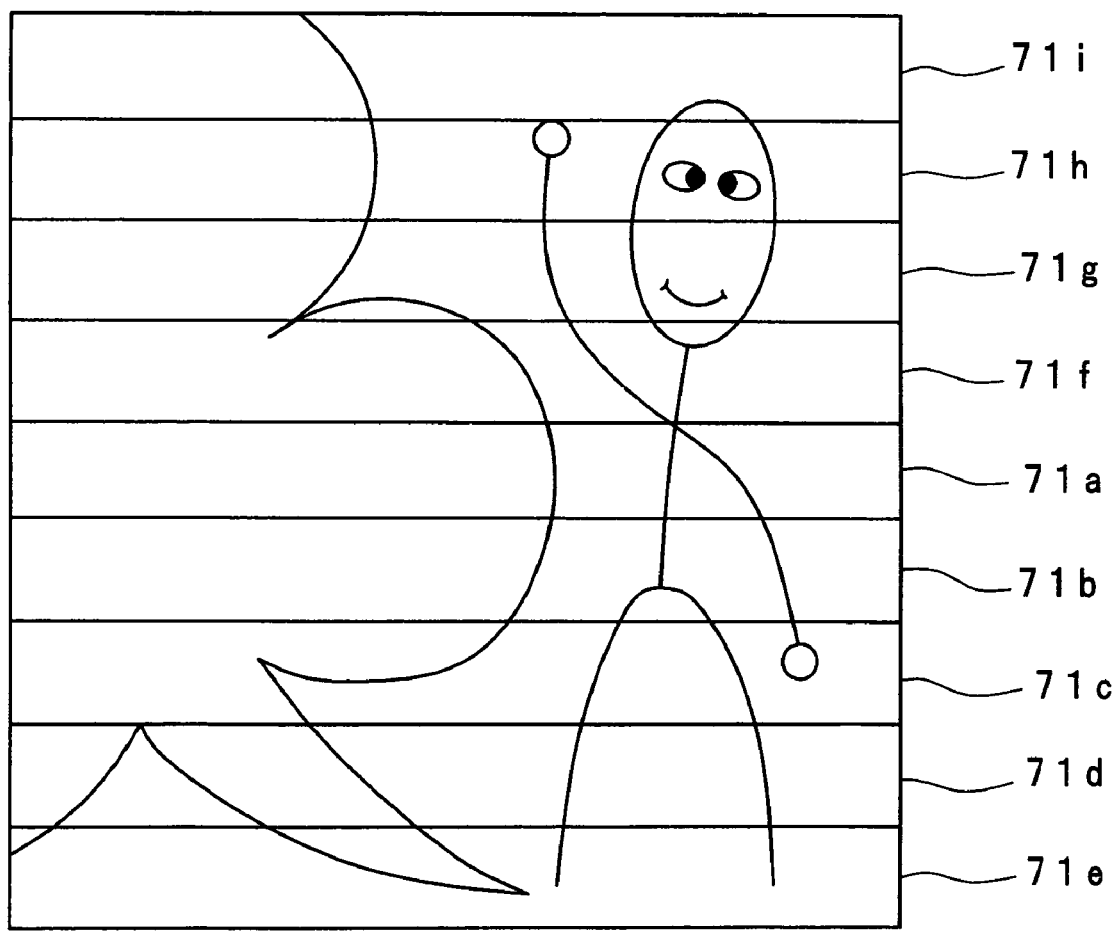
FIG. 18 shows an example of a subject image captured by a card camera according to an eleventh embodiment of the present invention.

FIG. 18 shows an example of the image represented by the image data stored in the storage unit 166. The lines where the image is divided into nine segments (image segments 71a, 71b, 71c, 71d, 71e, 71f, 71g, 71h, and, 71i) are shown in FIG. 18 for convenience but these lines are not present in the actual image data. More particularly, these lines are shown here simply to help understanding the image data generation process described below.

Figure 19A:
FIGS. 19A, 19B, 19C, 19D, 19E, 19F, 19G, 19H, and, 19I describe examples of the captured image segments during the imaging operation of a card camera according to an eleventh embodiment of the present invention.
Figure 19B:
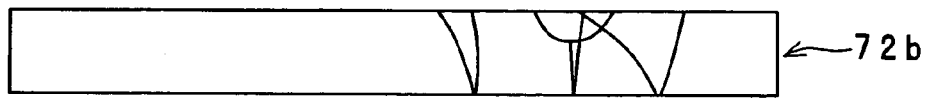

Imaging by the imaging apparatus 61 contained in the imaging unit 161 (see FIG. 9A) and the imaging process of the image data processing unit 165 are described next with reference to FIGS. 19A, 19B, 19C, 19D, 19E, 19F, 19G, 19H, and,19I, and FIG. 20.

As described above, a thin imaging apparatus according to the sixth embodiment of the invention uses a medium 41 or 42 that can be selectively controlled in part to reflecting and non-reflecting states as the mirror surfaces 7. As a result, this camera 60 captures multiple images of each subject while changing the reflecting/non-reflecting pattern of the mirror surfaces 7 to capture one image frame, extracts the image data corresponding to each of the reflecting/non-reflecting patterns from the imaging device 3 as electric signals, sends these multiple blocks of image data to the image data processing unit 165, and the image data processing unit 165 then processes the data to compile one frame of image data.

When the controller 164 detects that the shutter release button 62 in the operating unit 162 was pressed by the user (step S101 in FIG. 20), the controller 164 drives the imaging unit 161 to capture first, second, third, fourth, fifth, sixth, seventh, eighth, and, ninth image blocks 72a, 72b, 72c, 72d, 72e, 72f, 72g, 72h, and, 72i (step S102). FIGS. 19A, 19B, 19C, 19D, 19E, 19F, 19G, 19H, and, 19I represent the first to ninth image blocks 72a to 72i in the one image frame produced by the imaging unit 161. These image blocks are thus captured at slightly different times. However, the time interval between each image block is extremely short, and the compiled image appears the same as though the image data was captured simultaneously. The chronological order in which these image blocks are captured is also not specifically limited. Furthermore, while one image frame is captured in nine blocks in this embodiment, the invention shall not be so limited and the number of blocks can be determined as desired.

The first image block is captured by setting the entire mirror surface 7 of the imaging apparatus (see FIGS. 9A, 9B, 9C, 9D, and, 9E) to the non-reflecting mode (41). Light from the subject passes through the light guide 1 without being reflected by the mirror surfaces 7 in this first image block. The first image block thus represents an image of only the light that is directly incident to the emittance mirror 8 without being reflected by the mirror surfaces 7 and reflected onto the imaging device 3 by the emittance mirror 8. FIG. 19A shows the image 72a captured in this first imaging step. This image 72a corresponds to the middle image segment 71a in FIG. 18.

All of one of the two mirror surfaces 7 is then set to the reflection mode 42 while all of the other mirror surface 7 is set to the non-reflecting mode 41 to capture the next image block 72b (see FIG. 9B). This second image block contains images formed from light that is incident to the emittance mirror 8 without being reflected by a mirror surface 7, and light that is reflected once by the mirror surface 7 before being incident to the emittance mirror 8. FIG. 19B shows this second image block 72b. This image contains image segment 71a shown in FIG. 18 and image segment 71b vertically inverted and superimposed on image segment 71a.

Parts of the two mirror surfaces 7 are then set to the non-reflecting mode 41 and reflecting mode 42 to capture a third image segment (see FIG. 9C). In this third image segment the pattern of reflecting and non-reflecting areas in the mirror surfaces 7 (42 and 41) results in the light incident to the emittance mirror 8 including both light incident to the emittance mirror 8 without being reflected by the mirror surfaces 7, and light that is reflected twice by the mirror surfaces 7 before being incident to the emittance mirror 8.

Figure 19C:
Figure 20:
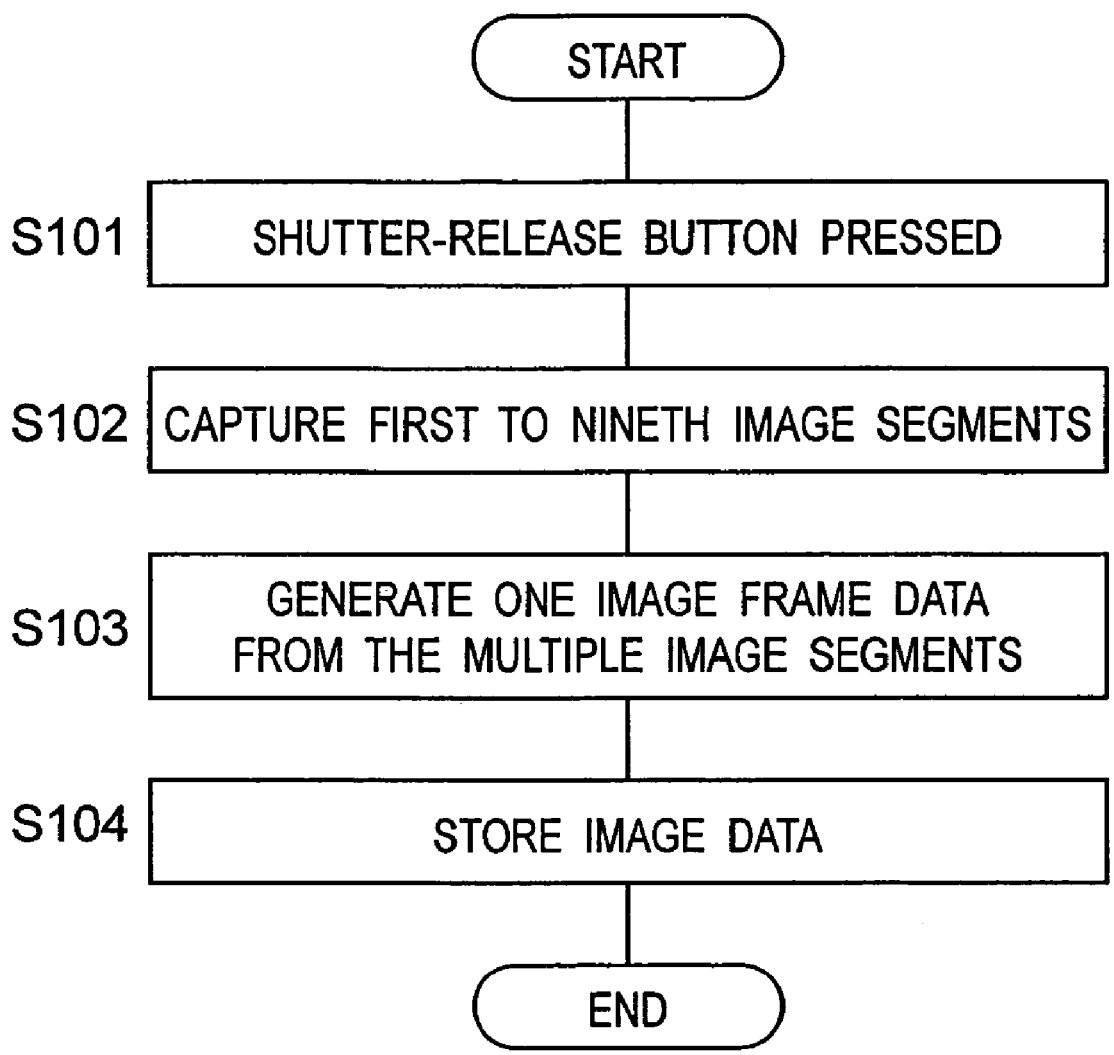
FIG. 20 is a flow chart describing the imaging process of a card camera according to an eleventh embodiment of the present invention.

FIG. 19C shows this third image segment 72c, which includes image segment 71c superimposed on image segment 71a in FIG. 18.

Figure 19D:
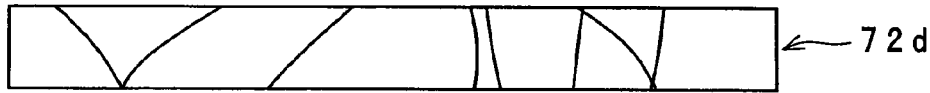

Parts of the two mirror surfaces 7 are then set to the non-reflecting mode 41 and reflecting mode 42 in a pattern different from that used for the third capture to capture a fourth image segment (see FIG. 9D). In this fourth image segment the pattern of reflecting and non-reflecting areas in the mirror surfaces 7 (42 and 41) results in the light incident to the emittance mirror 8 including both light incident to the emittance mirror 8 without being reflected by the mirror surfaces 7, and light that is reflected three times by the mirror surfaces 7 before being incident to the emittance mirror 8. FIG. 19D shows this fourth image segment 72d, which includes image segment 71d vertically inverted and superimposed on image segment 71a in FIG. 18.

Figure 19E:

Parts of the two mirror surfaces 7 are then set to the non-reflecting mode 41 and reflecting mode 42 in a pattern different from that used for the second, third, and, fourth captures to capture a fifth image segment. In this fifth image segment the pattern of reflecting and non-reflecting areas in the mirror surfaces 7 (42 and 41) results in the light incident to the emittance mirror 8 including both light incident to the emittance mirror 8 without being reflected by the mirror surfaces 7, and light that is reflected four times by the mirror surfaces 7 before being incident to the emittance mirror 8. FIG. 19E shows this fifth image segment 72e, which includes image segment 71e superimposed on image segment 71a in FIG. 18.

The sixth, seventh, eighth, and, ninth image segments are then similarly captured.

Figure 19F:

When capturing this sixth segment, the pattern of reflecting and non-reflecting areas in the mirror surfaces 7 (42 and 41) is the inverse of the pattern used to capture the second segment. FIG. 19F shows this sixth image segment 72f, which includes image segment 71f vertically reversed and superimposed on image segment 71a in FIG. 18.

Figure 19G:

When capturing the seventh segment, the pattern of reflecting and non-reflecting areas in the mirror surfaces 7 (42 and 41) is the inverse of the pattern used to capture the third segment. FIG. 19G shows this seventh image segment 72g, which includes image segment 71g superimposed on image segment 71a in FIG. 18.

Figure 19H:
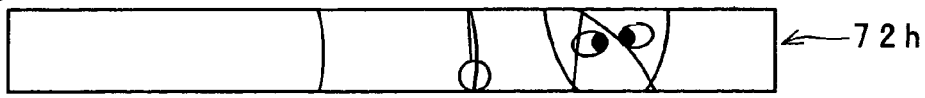

When capturing the eighth segment, the pattern of reflecting and non-reflecting areas in the mirror surfaces 7 (42 and 41) is the inverse of the pattern used to capture the fourth segment (see FIG. 9D). FIG. 19H shows this eighth image segment 72h, which includes image segment 71h vertically reversed and superimposed on image segment 71a in FIG. 18.

Figure 19I:

When capturing the ninth segment, the pattern of reflecting and non-reflecting areas in the mirror surfaces 7 is the inverse of the pattern used to capture the fifth segment. FIG. 19I shows this ninth image segment 72i, which includes image segment 71i superimposed on image segment 71a in FIG. 18.

The image data captured in these first to ninth segments is then passed to the image data processing unit 165. The image data passed to the image data processing unit 165 is processed and converted by the image data processing unit 165 to image data representing one full frame (step S103 in FIG. 20).

First, the image data contained in the first segment 72a is subtracted from the image data in the second to ninth segments, and the image data in the second, fourth, sixth, and eighth segments is then vertically inverted. The luminance values in the first image segment and the processed image segments are then adjusted, and the image data of these nine segments are vertically merged to produce the image data for one frame.

The compiled image is then stored to storage unit 166 (step S104).

A card camera according to this embodiment of the invention uses the low profile of this thin imaging apparatus, but the camera shall not be limited to a card shape insofar as the benefit of a thin profile is not impaired.

An imaging apparatus and camera according to the present invention shall also not be limited to capturing still images, and could be used for capturing video.

This card camera could also function as a credit card. A facial image of the cardholder could also be stored internally. When the credit card is then used, the camera function could be used to take a picture of the user and output the image through the external interface 63 to an authentication server.

The low profile of a thin imaging apparatus according to the present invention also enables using the imaging apparatus of this invention as an imaging apparatus in an endoscope probe, for example.

A thin imaging apparatus according to the present invention thus easily enables rendering collector optics with a long focal length in an extremely thin light path, thereby enabling high resolution imaging. An imaging apparatus according to the present invention can thus be advantageously used as a camera module or other imaging apparatus where a thin profile and high image quality are desirable.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A thin imaging apparatus comprising:
an aperture;
an incidence mirror for simultaneously reflecting incident light entering from a subject through said aperture;
a light guide for guiding incident light reflected by said incidence mirror;
a mirror surface disposed to at least part of a surface of said light guide; and
an imaging device for simultaneously receiving in a superimposed condition at least a first light component representing one part of the subject guided through said light guide without being reflected by said mirror surface and a second light component representing the other part of the subject reflected at least once and guided through said light guide by said mirror surface.

2. The thin imaging apparatus as described in claim 1, wherein said light guide has a substantially flat external shape with two mutually parallel main surfaces.

3. The thin imaging apparatus as described in claim 1, wherein said incidence mirror comprises one or a plurality of mirrors for collecting light incident to said incidence mirror on a specific focal point inside said light guide or near the emission end of said light guide.

4. The thin imaging apparatus as described in claim 1, wherein said incidence mirror has a rectangular shape.

5. The thin imaging apparatus as described in claim 3, wherein said incidence mirror has a curved arc shape centered on the specific focal point.

6. The thin imaging apparatus as described in claim 3, wherein the plurality of mirrors constituting said incidence mirror have curved arc shapes centered on the same focal point.

7. The thin imaging apparatus as described in claim 3, wherein the one or plurality of mirrors in said incidence mirror are arranged in one row in a direction perpendicular to a main axis through the center of said incidence mirror and the specific focal point.

8. The thin imaging apparatus as described in claim 1, wherein at least part of said incidence mirror is concave in section, and
said concave section part of the incidence mirror collects light from the subject on the specific focal point.

9. The thin imaging apparatus as described in claim 1, wherein an incidence side lens is disposed near said incidence mirror on the light path from the subject to said incidence mirror.

10. The thin imaging apparatus as described in claim 9, wherein said incidence side lens has a surface with a specific curvature, and said incidence side lens collects light incident to said incidence mirror.

11. The thin imaging apparatus as described in claim 9, wherein said incidence mirror has a substantially flat reflecting surface.

12. The thin imaging apparatus as described in claim 1, further comprising an emittance mirror disposed near the emission end of said light guide, and
said emittance mirror reflects and guides light emitted from the emission end to said imaging device.

13. The thin imaging apparatus as described in claim 1, wherein the distance between said imaging device and said incidence mirror is adjustable.

14. The thin imaging apparatus as described in claim 13, wherein said imaging device can slide substantially parallel to the direction of travel of incident light inside said light guide.

15. The thin imaging apparatus as described in claim 13, wherein said incidence mirror can slide substantially parallel to the direction of travel of incident light inside the light guide.

16. The thin imaging apparatus as described in claim 15, further comprising a plurality of incidence-side lenses near said incidence mirror on the light path from the subject to said incidence mirror;
wherein said incidence mirror can slide to select said incidence-side lens that passes light incident to said incidence mirror.

17. The thin imaging apparatus as described in claim 1, further comprising a means for optically separating image data containing optical image information from a plurality of visual fields mutually superimposed in the incident light into optical image data for each visual field.

18. The thin imaging apparatus as described in claim 17, wherein said separating means is disposed before said imaging device, and
said separating means separates image data contained in the incident light incident to said imaging device based on the incidence angle to said imaging device.

19. The thin imaging apparatus as described in claim 18, wherein said separating means is a plurality of cylindrical lenses disposed in an array separated a specific distance from and in front of said imaging device.

20. The thin imaging apparatus as described in claim 19, wherein said plurality of cylindrical lenses are movable in the same direction as said cylindrical lenses are separated from said imaging device and/or in the same direction as said cylindrical lenses are arrayed, and
relative displacement of said cylindrical lenses to said imaging device separates image data containing optical image information from a plurality of visual fields mutually superimposed in the incident light into optical image data for each visual field.

21. The thin imaging apparatus as described in claim 18, wherein said separating means is one or a plurality of slits disposed in an array separated a specific distance from and in front of said imaging device.

22. The thin imaging apparatus as described in claim 21, wherein said slit array is movable in the same direction as the array is separated from said imaging device and/or in the same direction as said slits are arrayed, and
relative displacement of said slit array to sadi imaging device separates image data containing optical image information from a plurality of visual fields mutually superimposed in the incident light into optical image data for each visual field.

23. The thin imaging apparatus as described in claim 21, wherein said slit array has liquid crystal shutters, and
said liquid crystal shutters are selectively turned on and off to achieve the optical function of the slits.

24. The thin imaging apparatus as described in claim 23, wherein said liquid crystal shutters switch sequentially on and off, and
said liquid crystal shutters thereby change the part passing light and separate image data containing optical image information from a plurality of visual fields mutually superimposed in the incident light into optical image data for each visual field.

25. The thin imaging apparatus as described in claim 17, wherein said separating means is a means enabling moving said imaging device perpendicularly and/or parallel to the imaging surface, and
said separating means separates image data containing optical image information from a plurality of visual fields mutually superimposed in the incident light into optical image data for each visual field based on change in the subject image resulting from moving said imaging device.

26. The thin imaging apparatus as described in claim 17, further comprising an emittance mirror for reflecting light emitted from said light guide onto said imaging device disposed near the emission end of said light guide;
wherein said separating means is a means enabling moving said emittance mirror in the same direction as said emittance mirror is separated from said light guide, and
said separating means separates image data containing optical image information from a plurality of visual fields mutually superimposed in the incident light into optical image data for each visual field based on change in the subject image resulting from moving said emittance mirror.

27. The thin imaging apparatus as described in claim 1, further comprising an external medium having a refractive index lower than the refractive index of said light guide disposed externally to said light guide;
wherein said mirror surface is the interface between said light guide and said external medium.

28. The thin imaging apparatus as described in claim 27, wherein said external medium is air.

29. The thin imaging apparatus as described in claim 27, further comprising a light absorbing material externally to said external medium.

30. The thin imaging apparatus as described in claim 1, wherein said light guide has said mirror surface neighboring said aperture, and
said mirror surface passes light incident to said aperture from the outside to said aperture.

31. The thin imaging apparatus as described in claim 1, wherein said light guide comprise said mirror surface near the emission end of said light guide, and
said mirror surface passes light emitted from said light guide to the outside.

32. The thin imaging apparatus as described in claim 1, wherein the one or plurality of mirror surface segments in said mirror surface can be individually controlled to a reflecting or non-reflecting mode.

33. The thin imaging apparatus as described in claim 32, further comprising a means for separating image data containing optical image information from a plurality of visual fields mutually superimposed in the incident light into optical image data for each visual field;
wherein said separating means individually controls the plurality of mirror surface segments in said mirror surface to a reflecting or non-reflecting mode.

34. The thin imaging apparatus as described in claim 32, further comprising an external medium disposed externally to said light guide;
wherein said mirror surface is the interface between said light guide and said external medium, and
said mirror surface is controlled to reflect or not reflect by controlling the magnitude relation between the absolute refractive index of said light guide and the absolute refractive index of said external medium, and/or the difference between said absolute refractive indices.

35. The thin imaging apparatus as described in claim 32, further comprising a liquid crystal layer disposed externally to said light guide;
wherein said mirror surface is the interface between said light guide and said liquid crystal layer, and said mirror surface is controlled to reflect or not reflect by controlling the absolute refractive index of said liquid crystal layer.

36. The thin imaging apparatus as described in claim 1, wherein said light guide has a hollow space in at least part thereof.

37. The thin imaging apparatus as described in claim 36, wherein the hollow space is filled with liquid;
an external medium with an absolute refractive index lower than the absolute refractive index of the liquid is disposed externally to said light guide; and
said mirror surface is the interface between said light guide and external medium.

38. A camera comprising:
a thin imaging apparatus comprising:
an aperture;
an incidence mirror for simultaneously reflecting incident light entering from a subject through the aperture;
a light guide for guiding incident light reflected by the incidence mirror;
a mirror surface disposed to at least part of a surface of the light guide; and
an imaging device for simultaneously receiving in a superimposed condition at least a first light component representing one part of the subject guided through the light guide without being reflected by the mirror surface and a second light component representing the other part of the subject reflected at least once and guided through the light guide by the mirror surface;
an operating unit enabling an operator to input an imaging command;
an image data processing unit for generating image data by applying a specific process to image information from said thin imaging apparatus;
a storage unit for storing the image data; and
a controller for controlling said thin imaging apparatus, image data processing unit, and storage unit.

39. A camera comprising
a thin imaging apparatus comprising:
an aperture;
an incidence mirror for simultaneously reflecting incident light entering from a subject through the aperture;
a light guide for guiding incident light reflected by the incidence mirror;
a mirror surface disposed to at least part of a surface of the light guide; and
an imaging device for simultaneously receiving in a superimposed condition at least a first light component representing one part of the subject guided through the light guide without being reflected by the mirror surface and a second light component representing the other part of the subject reflected at least once and guided through the light guide by the mirror surface; and
said thin imaging apparatus is built in to a card case.

40. An imaging method comprising:
a step of guiding a first light component that is part of incident light from a subject through a light guide directly to an imaging device without the first light component being reflected by a mirror surface formed on a surface of the light guide;
a step of guiding a second light component that is another part of incident light from the subject through the light guide to the imaging device by reflecting the second light component at least once off a mirror surface formed on a surface of the light guide; and
a step of simultaneously outputting at least an image of the first light component and an image of the second light component superimposed to each other from the imaging device.

* * * * *

UNITED STATES PATENT AND TRADEMARK OFFICE
CERTIFICATE OF CORRECTION

PATENT NO. : 7,106,526 B2
APPLICATION NO. : 11/109373
DATED : September 12, 2006
INVENTOR(S) : Tomita et al.

It is certified that error appears in the above-identified patent and that said Letters Patent is hereby corrected as shown below:

Column 22, line 16 of the Letters Patent, in claim 22 (Amendment claim 22), "array to sadi imaging" should read --array to said imaging--.

Signed and Sealed this

Sixth Day of February, 2007

JON W. DUDAS
*Director of the United States Patent and Trademark Office*